United States Patent
Kim et al.

(10) Patent No.: US 10,735,169 B2
(45) Date of Patent: Aug. 4, 2020

(54) METHOD FOR TRANSMITTING AND RECEIVING PHASE NOISE COMPENSATION REFERENCE SIGNAL IN WIRELESS COMMUNICATION SYSTEM, AND APPARATUS THEREFOR

(71) Applicant: LG ELECTRONICS INC., Seoul (KR)

(72) Inventors: Kyuseok Kim, Seoul (KR); Kilbom Lee, Seoul (KR); Jaehoon Chung, Seoul (KR); Minki Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,340

(22) PCT Filed: Feb. 8, 2017

(86) PCT No.: PCT/KR2017/001375
§ 371 (c)(1),
(2) Date: Nov. 23, 2018

(87) PCT Pub. No.: WO2017/213326
PCT Pub. Date: Dec. 14, 2017

(65) Prior Publication Data
US 2019/0097776 A1    Mar. 28, 2019

Related U.S. Application Data

(60) Provisional application No. 62/347,640, filed on Jun. 9, 2016.

(51) Int. Cl.
*H04L 5/00* (2006.01)
*H04W 72/04* (2009.01)

(52) U.S. Cl.
CPC .............. *H04L 5/0053* (2013.01); *H04L 5/00* (2013.01); *H04W 72/04* (2013.01); *H04W 72/042* (2013.01)

(58) Field of Classification Search
CPC ....... H04L 5/00; H04L 5/0051; H04L 5/0053; H04W 72/02; H04W 72/04; H04W 72/042; H04W 72/0423
See application file for complete search history.

(56) References Cited

U.S. PATENT DOCUMENTS

| | | | |
|---|---|---|---|
| 2012/0213096 A1* | 8/2012 | Krishnamurthy | ....... H04L 5/001 370/252 |
| 2013/0121276 A1 | 5/2013 | Kim et al. | |

(Continued)

FOREIGN PATENT DOCUMENTS

| | | |
|---|---|---|
| KR | 1020110086523 | 7/2011 |
| KR | 101474732 | 12/2014 |

(Continued)

OTHER PUBLICATIONS

LG Electronics, "Summary of email discussion [84-11] on DM-RS and phase rotation for NB-IoT," R1-161972, 3GPP TSG RAN WG1 NB-IoT Ad-Hoc Meeting, Sophia Antipolis, France, Mar. 22-24, 2016, 8 pages.

(Continued)

*Primary Examiner* — Candal Elpenord
(74) *Attorney, Agent, or Firm* — Fish & Richardson P.C.

(57) ABSTRACT

A method for transmitting and receiving, by a user equipment (UE), a phase noise compensation reference signal (PCRS) in a wireless communication system is disclosed. The method includes receiving, from a base station, control information related to a transmission of a downlink data, the control information including at least one of a precoding scheme related to the downlink data, a number of transmission ranks, or a modulation and coding scheme (MCS) level; checking a transmission location of a demodulation reference signal (DM-RS) for demodulating the downlink data based on the received control information; and receiving, from the base station, the PCRS on at least one symbol after (Continued)

a transmission symbol of the DM-RS considering the checked transmission location of the DM-RS.

14 Claims, 14 Drawing Sheets

(56) References Cited

U.S. PATENT DOCUMENTS

| | | | | |
|---|---|---|---|---|
| 2013/0215845 | A1* | 8/2013 | Lee | H04L 1/0072 370/329 |
| 2014/0254539 | A1* | 9/2014 | Nagata | H04L 5/0051 370/329 |
| 2014/0293881 | A1 | 10/2014 | Khoshnevis et al. | |
| 2016/0006594 | A1 | 1/2016 | Persson et al. | |
| 2017/0048086 | A1* | 2/2017 | Subramanian | H04L 25/0236 |
| 2017/0294926 | A1* | 10/2017 | Islam | H04B 17/336 |
| 2017/0302352 | A1* | 10/2017 | Islam | H04B 7/0626 |
| 2017/0302495 | A1* | 10/2017 | Islam | H04L 5/0048 |
| 2018/0212733 | A1 | 7/2018 | Khoryaev et al. | |
| 2019/0007248 | A1* | 1/2019 | Takeda | H04L 27/2607 |
| 2019/0081825 | A1* | 3/2019 | Pajukoski | H04L 25/03 |

FOREIGN PATENT DOCUMENTS

| | | |
|---|---|---|
| KR | 1020150090586 | 8/2015 |
| KR | 1020150135210 | 12/2015 |
| KR | 1020160025487 | 3/2016 |
| KR | 1020160052747 | 5/2016 |
| WO | WO2016000915 | 1/2016 |
| WO | WO2016048074 | 3/2016 |

OTHER PUBLICATIONS

Samsung, "Discussion on phase noise modeling," R1-163984, 3GPP TSG RAN WG1 Meeting #85, Nanjing, China, dated May 13, 2016, 11 pages.
Huawei, HiSilicon, "Phase noise model for above 6 GHz," R1-164041, 3GPP TSG RAN WG1 Meeting #85, Nanjing, China, dated May 15, 2016, 8 pages.
CMCC, "Phase Noise in High Frequency Bands for New Radio Systems," R1-164888, 3GPP TSG RAN WG1 Meeting #85bis, Nanjing, China, dated May 13, 2016.
Nokia, Alcatel-Lucent Shanghai Bell, "Main components for forward compatible frame structure design in NR," R1-165029, 3GPP TSG-RAN WG1 #85, Nanjing, P.R. China, May 23-27, 2016, 7 pages.
NTT Docomo, Inc., "PUSCH design for shortened TTI," R1-163173, 3GPP TSG RAN WG1 Meeting #84bis, Busan, Korea, Apr. 11-15, 2016, 6 pages.
United States Office Action in U.S. Appl. No. 16/273,705, dated Oct. 23, 2019, 17 pages.

* cited by examiner

【Figure 1】
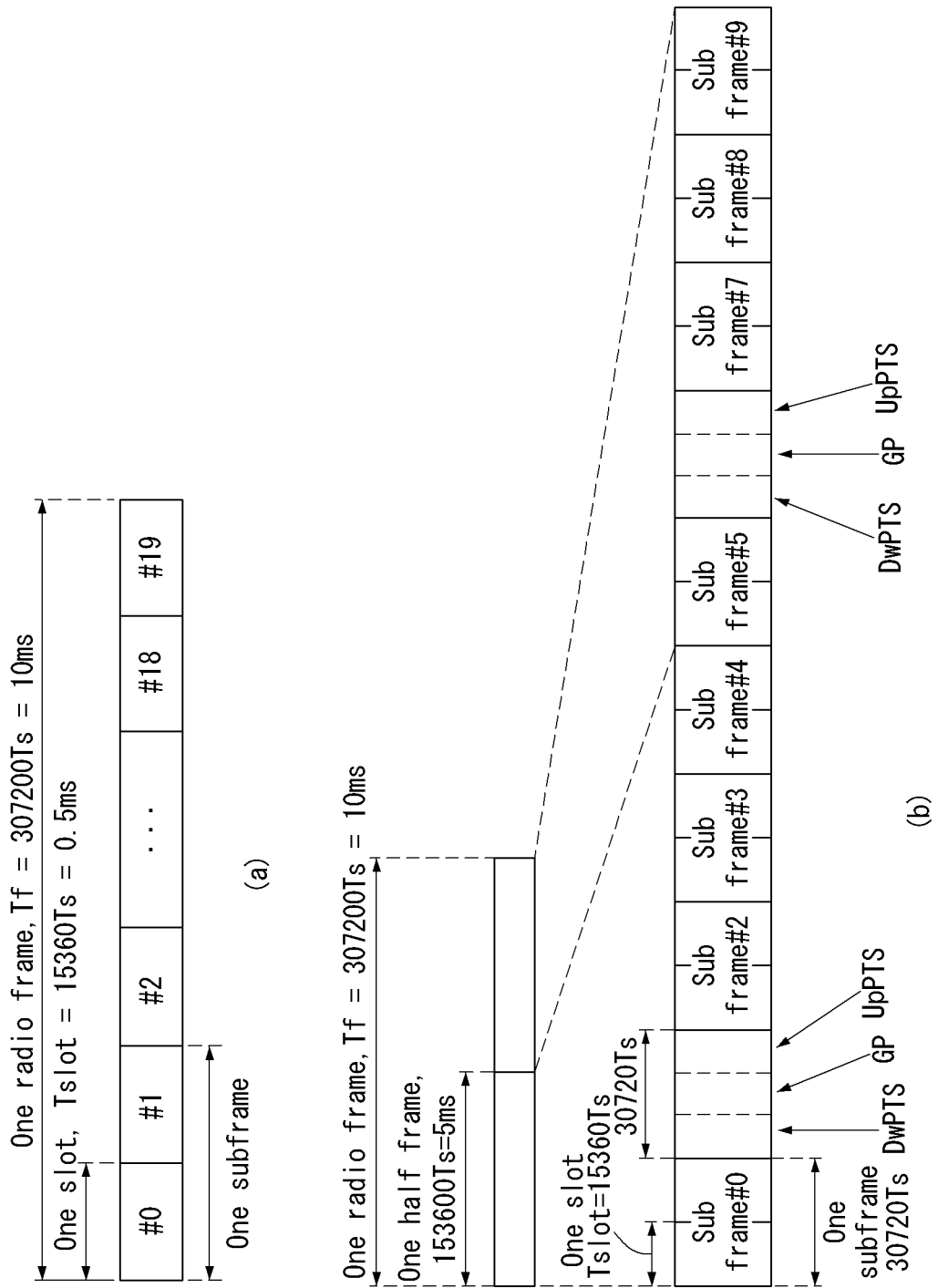

[Figure 2]
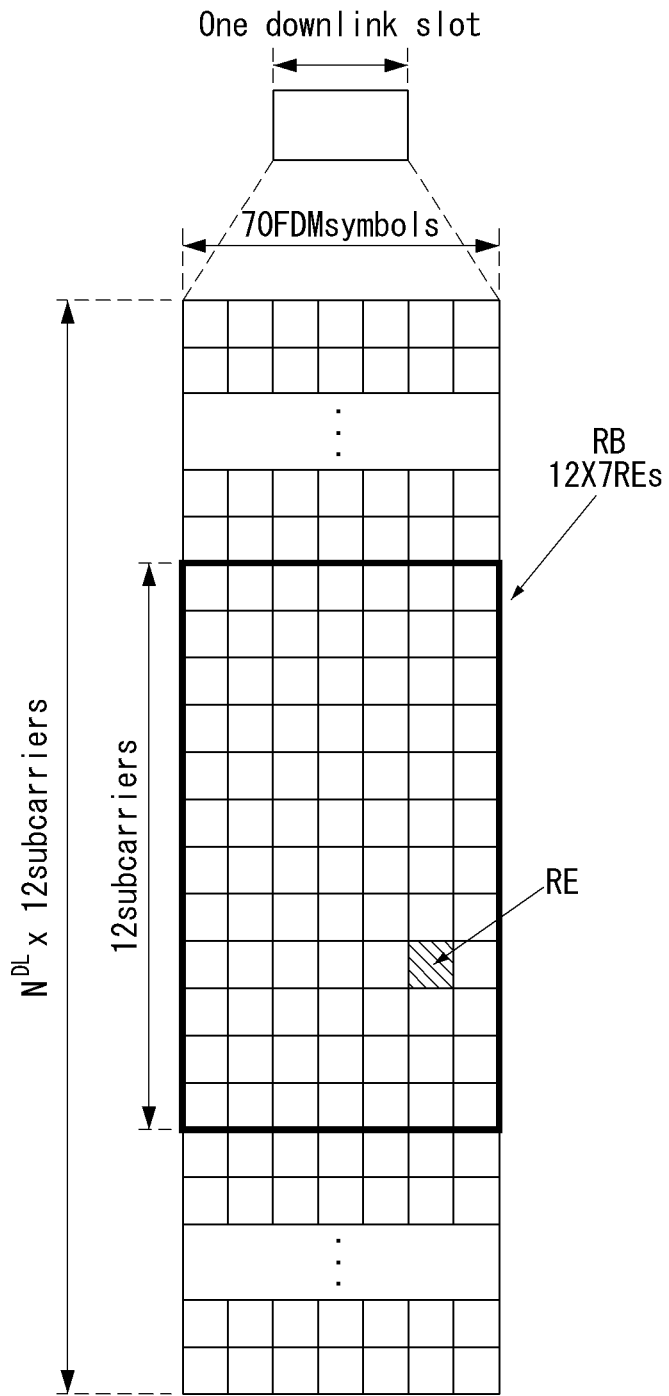

[Figure 3]
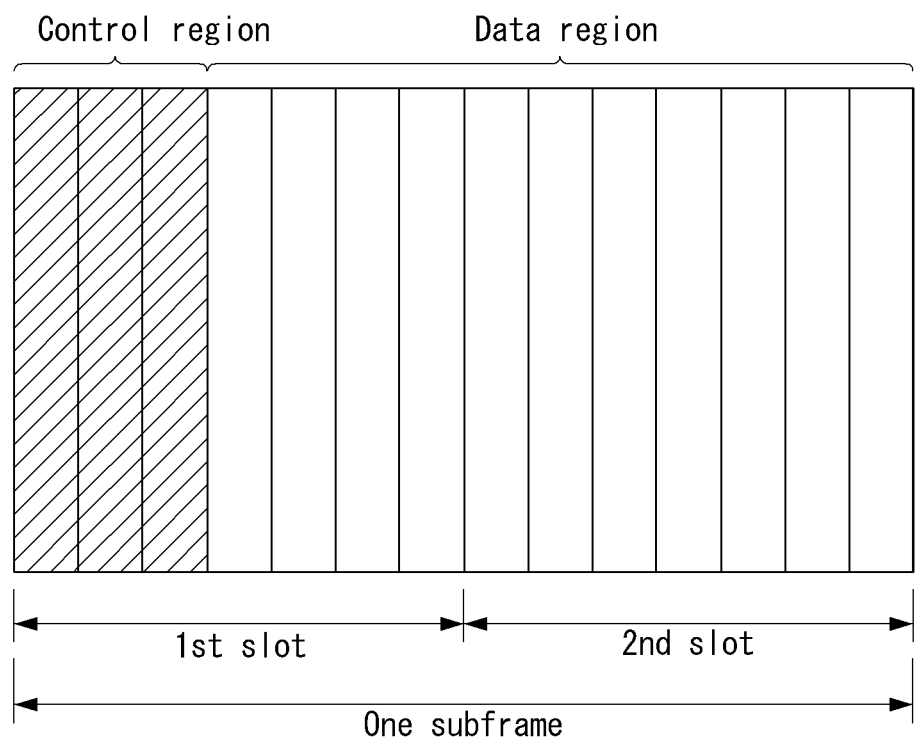

【Figure 4】
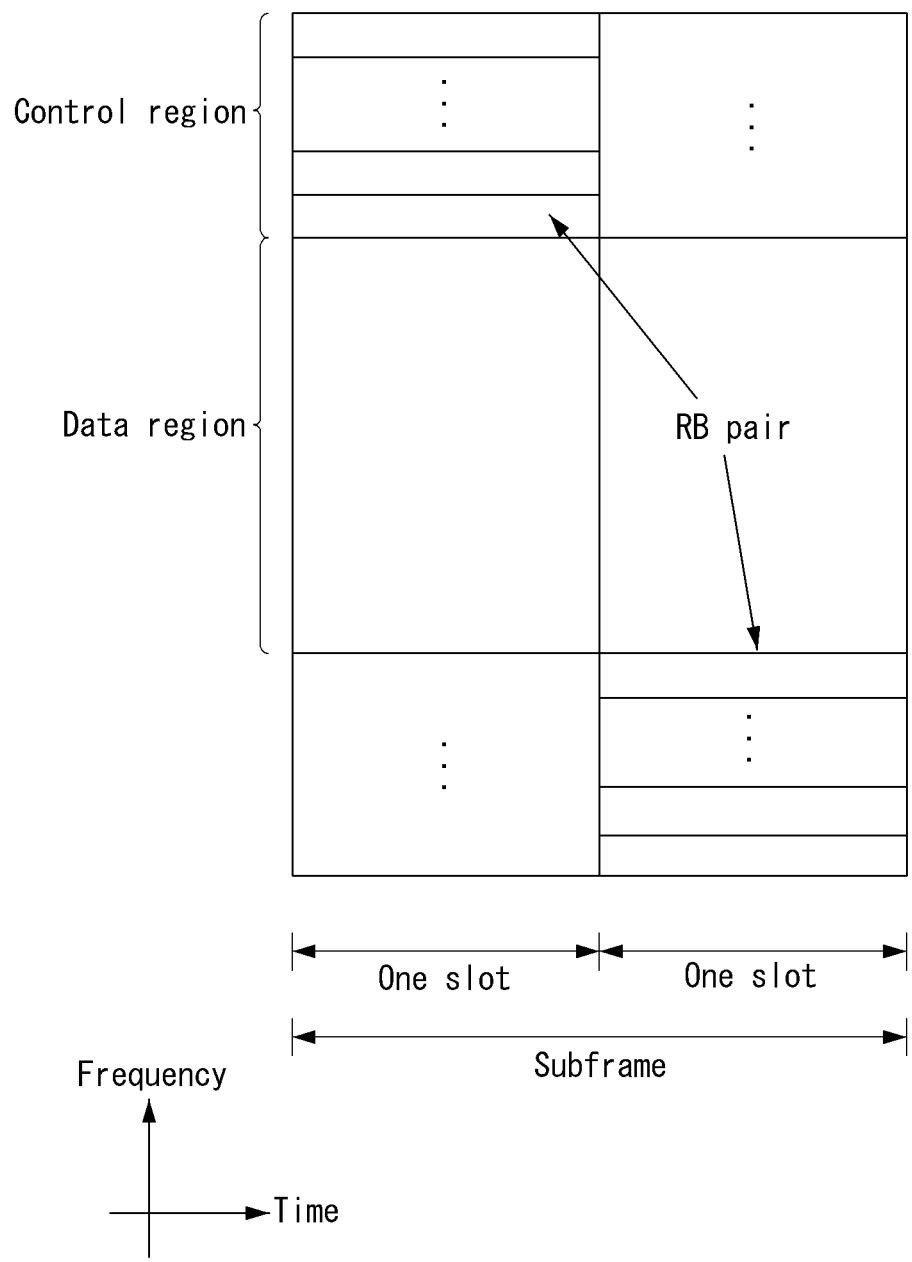

[Figure 5]
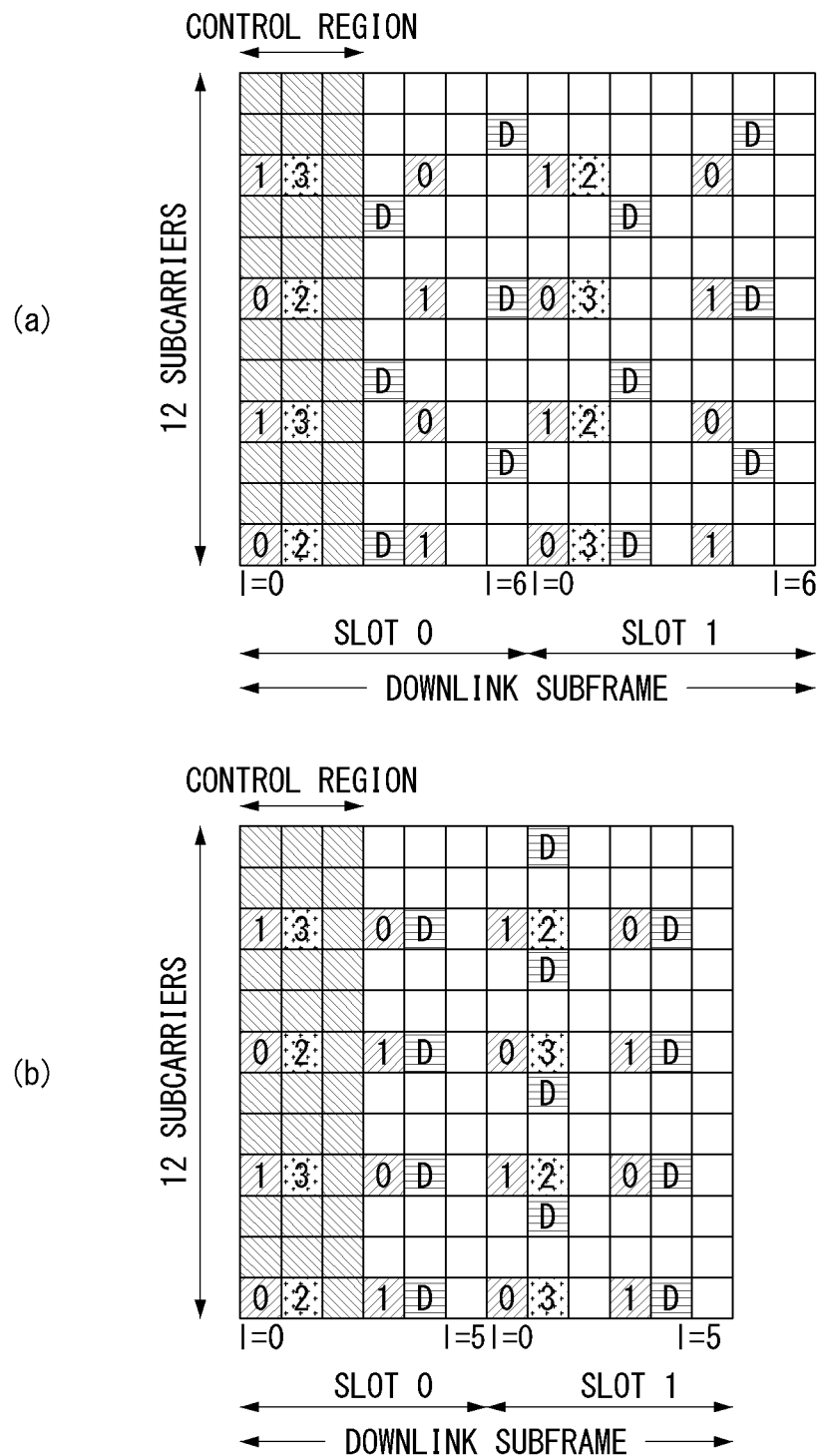

[Figure 6]
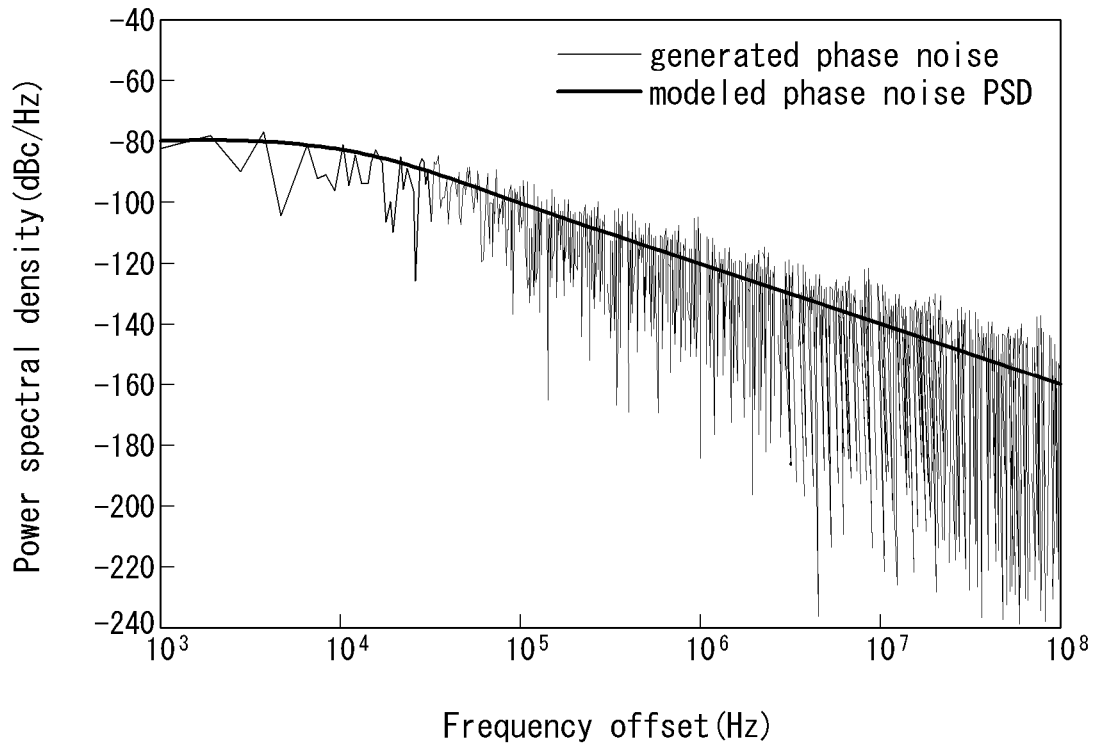
[Figure 7]
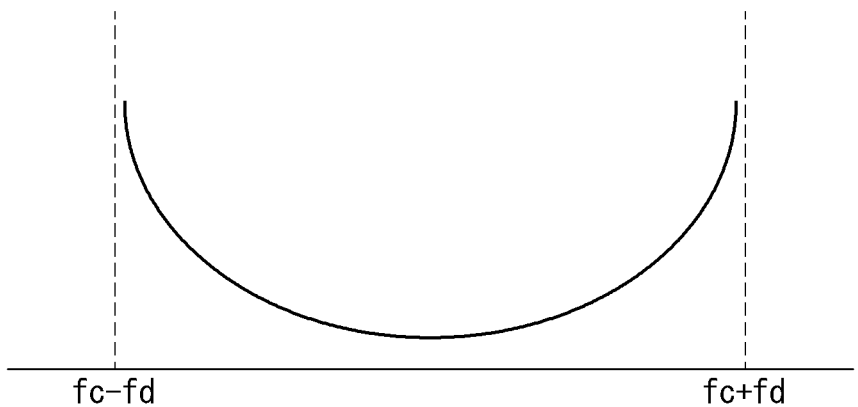

[Figure 8]
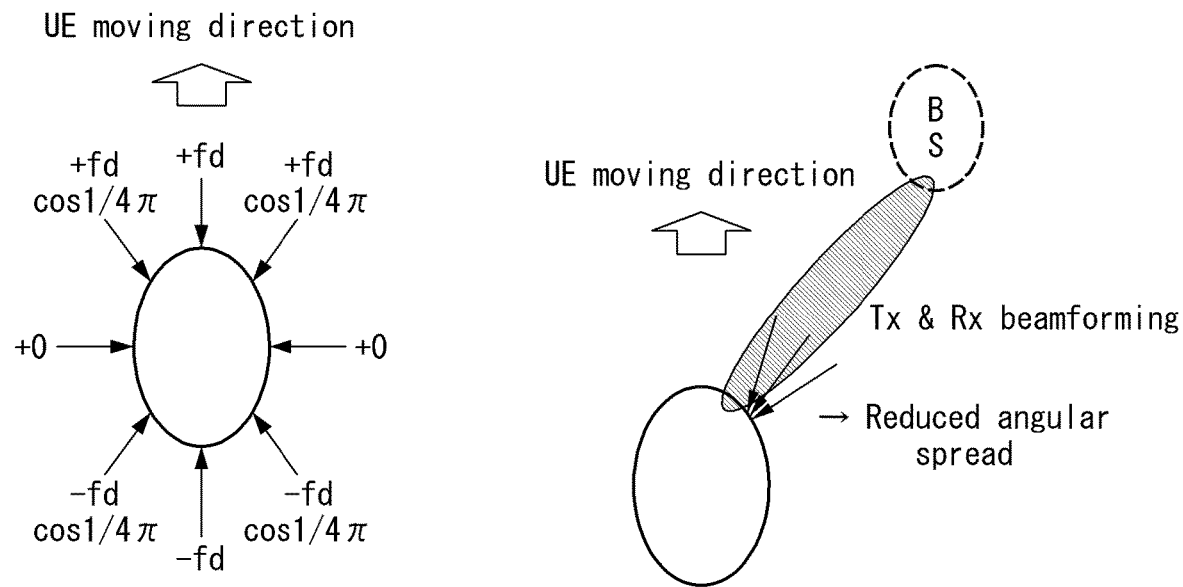
[Figure 9]
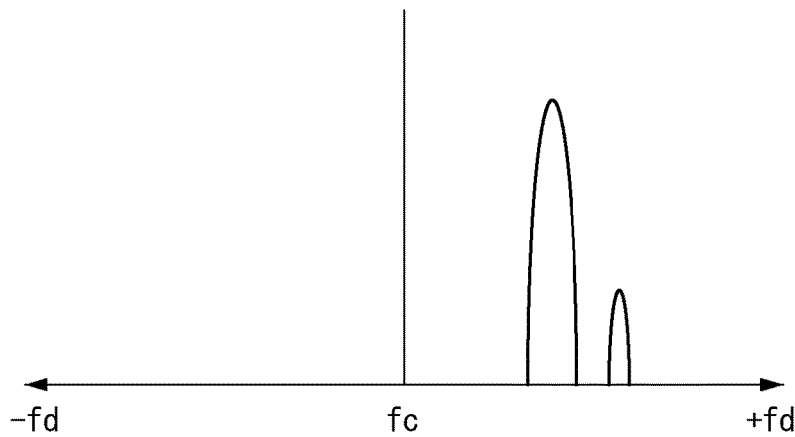

[Figure 10]
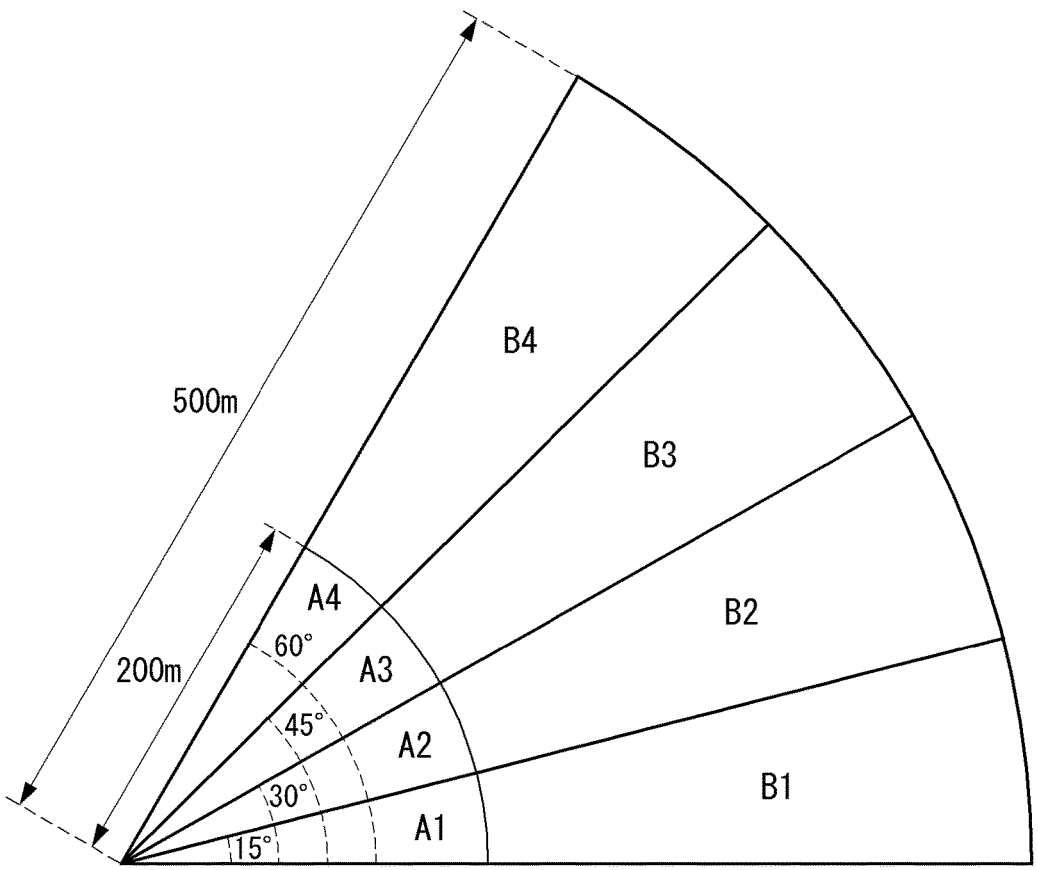
[Figure 11]
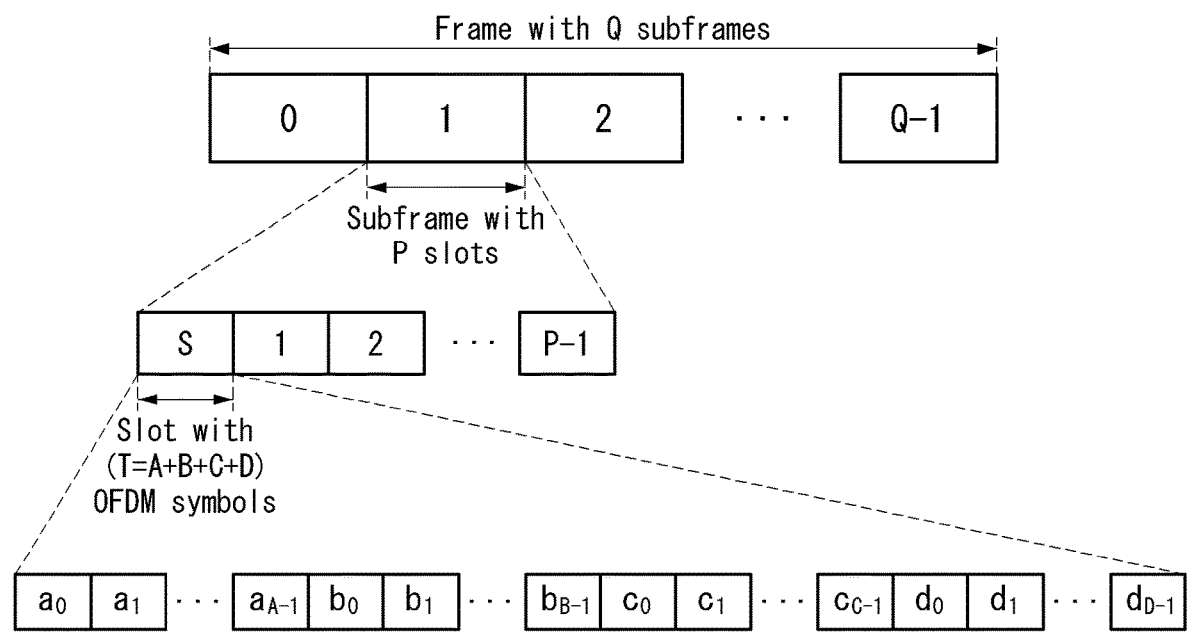

[Figure 12]
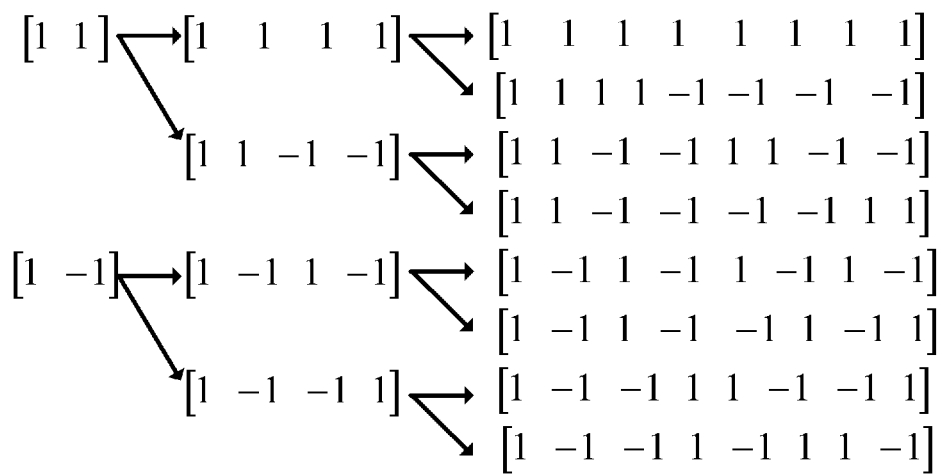
[Figure 13]
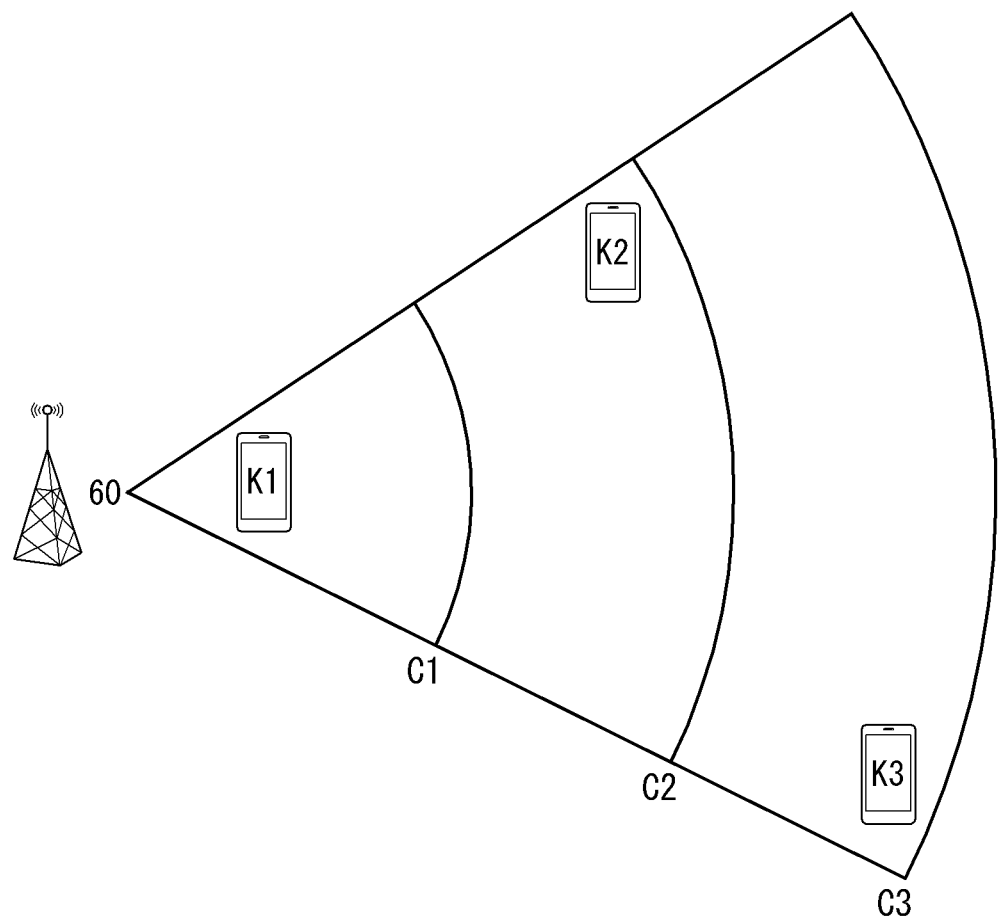

[Figure 14]
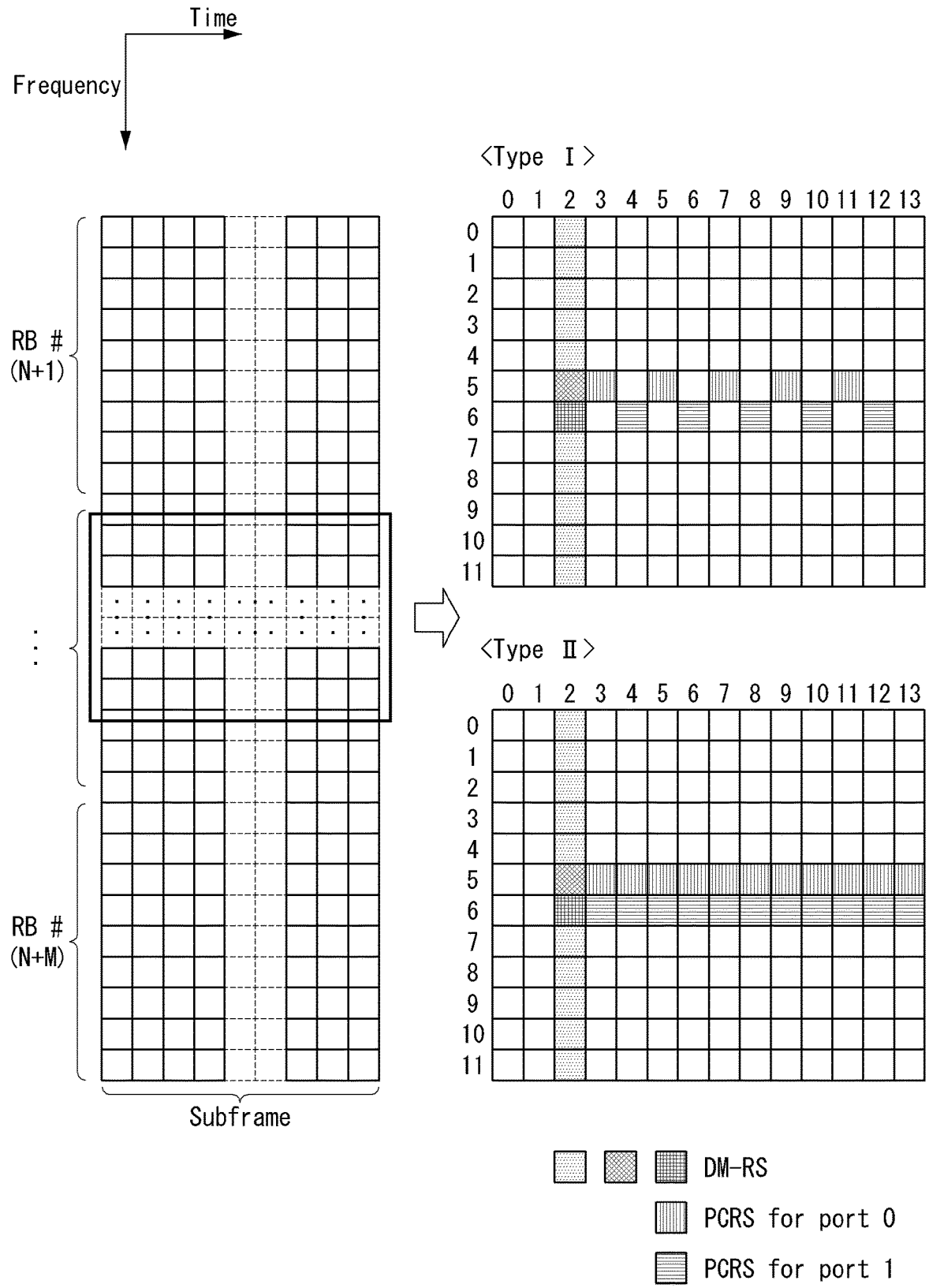

[Figure 15]
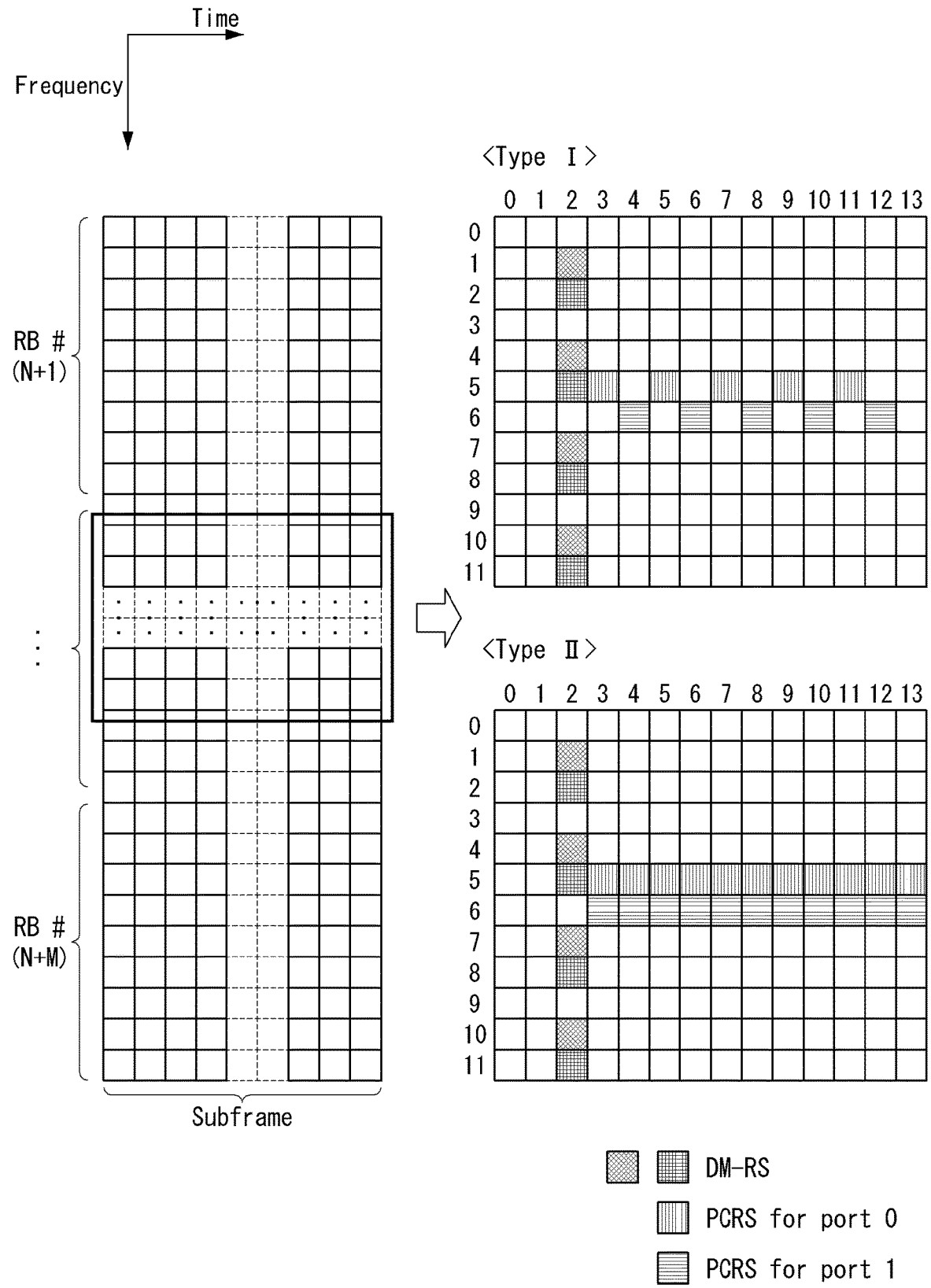

[Figure 16]
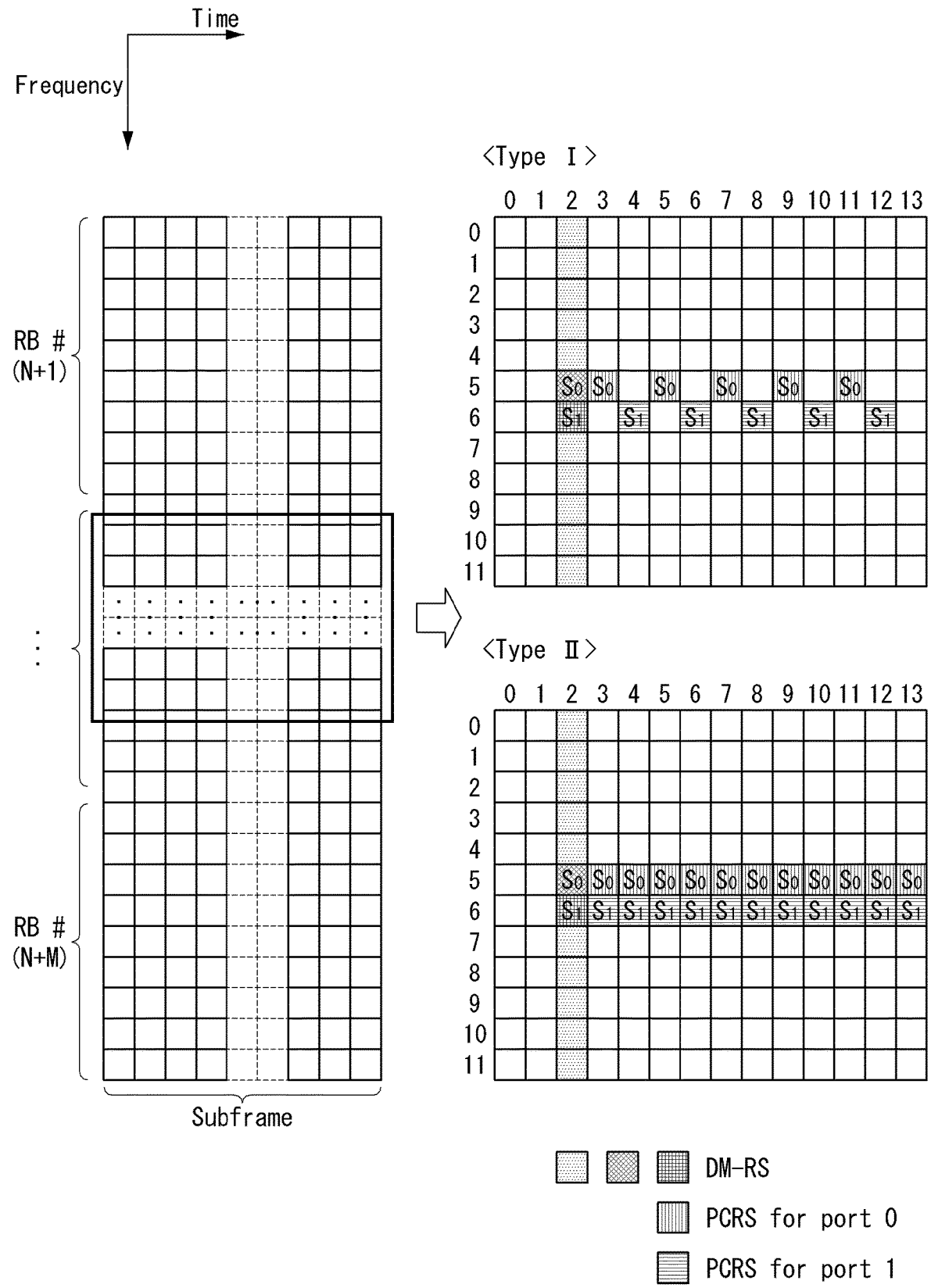

[Figure 17]
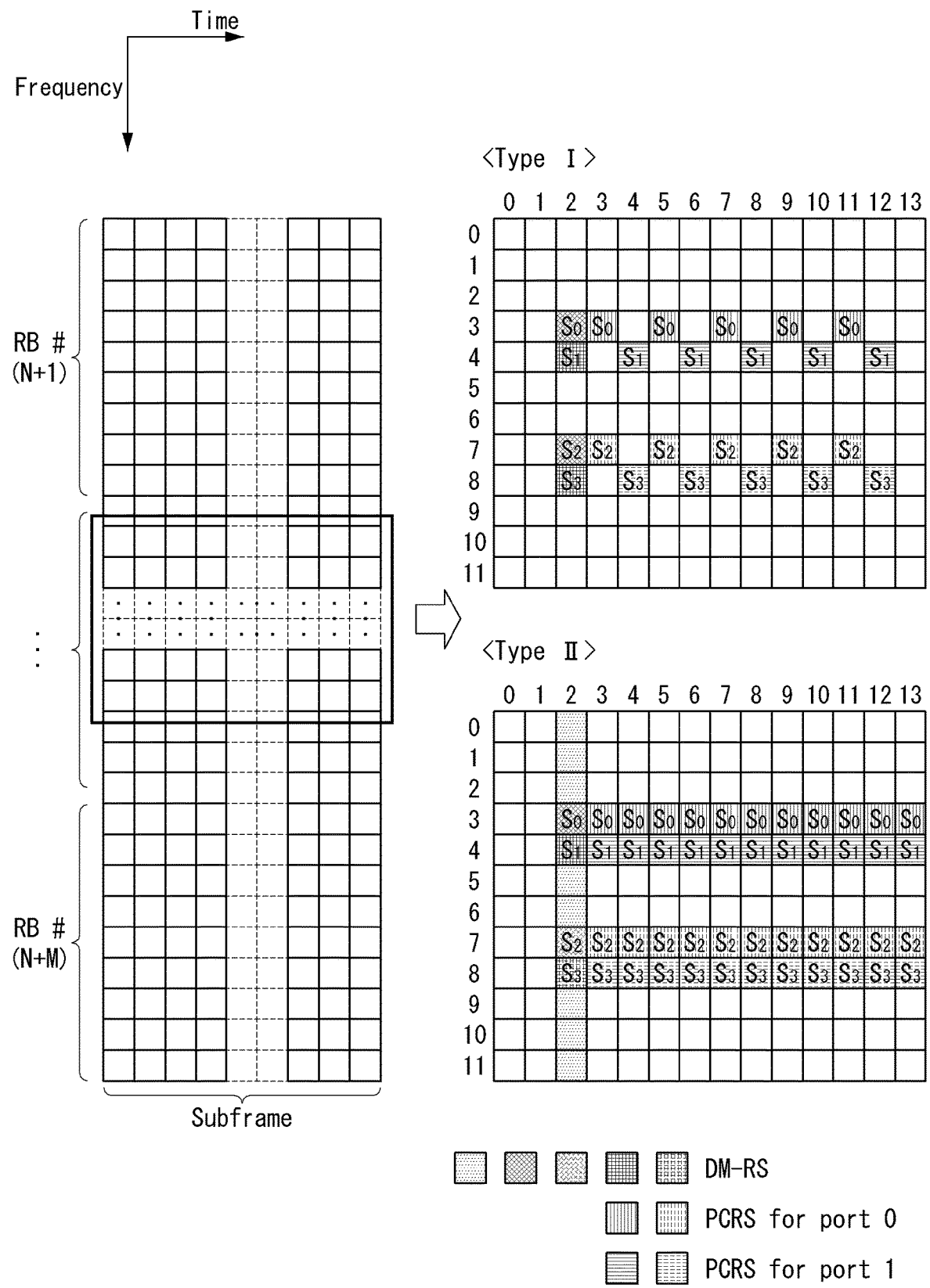

【Figure 18】
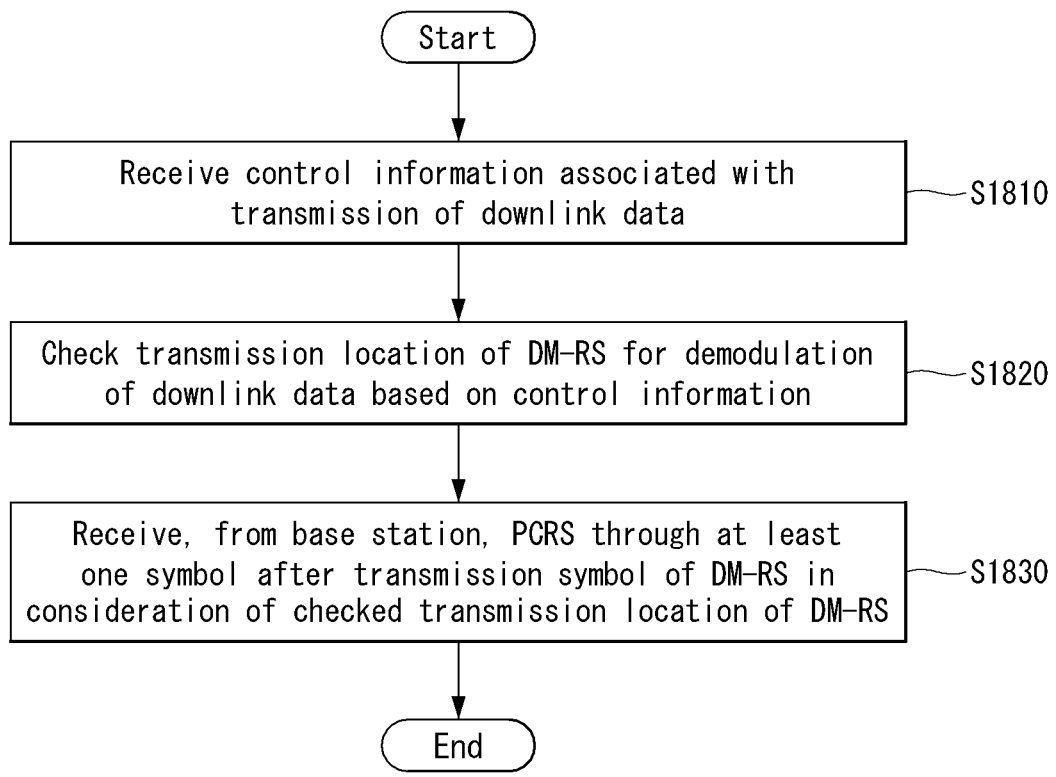
【Figure 19】
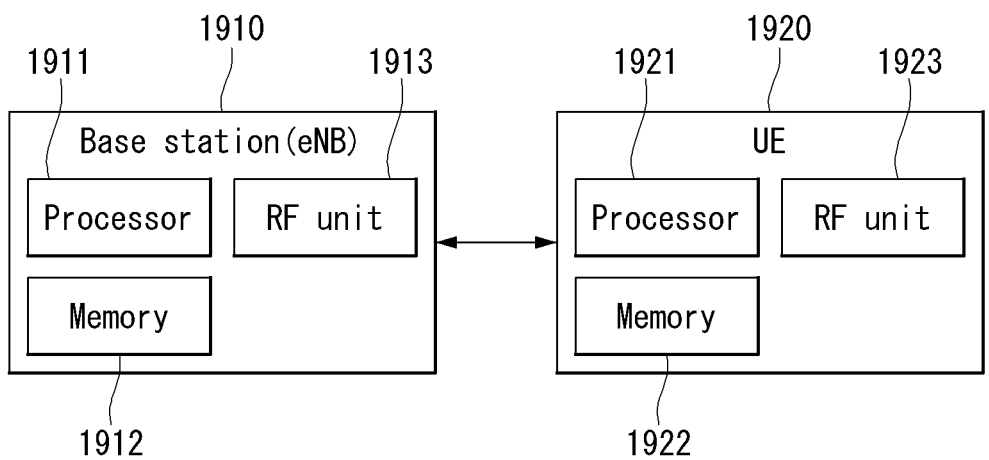

METHOD FOR TRANSMITTING AND RECEIVING PHASE NOISE COMPENSATION REFERENCE SIGNAL IN WIRELESS COMMUNICATION SYSTEM, AND APPARATUS THEREFOR

CROSS REFERENCE TO RELATED APPLICATIONS

This application is the National Phase of PCT International Application No. PCT/KR2017/001375, filed on Feb. 8, 2017, which claims priority under 35 U.S.C. 119(e) to U.S. Provisional Application No. 62/347,640, filed on Jun. 9, 2016, all of which are hereby expressly incorporated by reference into the present application.

TECHNICAL FIELD

This specification relates to a wireless communication system, and more particularly to a method for transmitting and receiving a Phase noise Compensation Reference Signal (PCRS) in a wireless communication system and an apparatus therefor.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

An object of this specification is to provide a method for defining a Phase noise Compensation Reference Signal (PCRS) for compensating a phase noise and a Doppler impact.

Another object of this specification is to provide a method for transmitting a PCRS in consideration of a transmission location of a Demodulation Reference Signal (DMRS).

Technical problems to be solved by the present invention are not limited by the above-mentioned technical problems, and other technical problems which are not mentioned above can be clearly understood from the following description by those skilled in the art to which the present invention pertains.

Technical Solution

This specification provides a method for transmitting and receiving, by a user equipment (UE), a phase noise compensation reference signal (PCRS) in a wireless communication system, the method comprising receiving, from a base station, control information related to a transmission of a downlink data, wherein the control information includes at least one of a precoding scheme related to the downlink data, a number of transmission ranks, or a modulation and coding scheme (MCS) level; checking a transmission location of a demodulation reference signal (DM-RS) for demodulating the downlink data based on the received control information; and receiving, from the base station, the PCRS on at least one symbol after a transmission symbol of the DM-RS considering the checked transmission location of the DM-RS.

In this specification, when the DM-RS is transmitted on the same frequency as the frequency, on which the PCRS is transmitted, as a result of checking the transmission location of the DM-RS, a sequence of the PCRS equally uses a sequence of the DM-RS.

In this specification, when the DM-RS is not transmitted on the same frequency as the frequency, on which the PCRS is transmitted, as a result of checking the transmission location of the DM-RS, a sequence of the PCRS equally uses a sequence of a DM-RS transmitted on a frequency closest to the frequency on which the PCRS is transmitted.

In this specification, the PCRS is transmitted on one or more antenna ports.

In this specification, when the PCRS is transmitted on multiple antenna ports, frequencies of PCRSs transmitted on different antenna ports are different from each other.

In this specification, when the PCRS is transmitted on two antenna ports, a PCRS transmitted on a first antenna port is transmitted at a frequency corresponding to a subcarrier index #5, and a PCRS transmitted on a second antenna port is transmitted at a frequency corresponding to a subcarrier index #6.

In this specification, a sequence of the PCRS is generated using a gold sequence.

This specification provides a user equipment (UE) for transmitting and receiving a phase noise compensation reference signal (PCRS) in a wireless communication system, the UE comprising a radio frequency (RF) unit for transmitting and receiving a radio signal; and a processor for controlling the RF unit, wherein the processor controls to receive, from a base station, control information related to a transmission of a downlink data, wherein the control information includes at least one of a precoding scheme related to the downlink data, a number of transmission ranks, or a modulation and coding scheme (MCS) level; check a transmission location of a demodulation reference signal (DM-RS) for demodulating the downlink data based on the received control information; and receive, from the base station, the PCRS on at least one symbol after a transmission symbol of the DM-RS considering the checked transmission location of the DM-RS.

In this specification, when the DM-RS is transmitted on the same frequency as the frequency, on which the PCRS is transmitted, as a result of checking the transmission location of the DM-RS, the processor controls to enable a sequence of the PCRS to equally use a sequence of the DM-RS.

In this specification, when the DM-RS is not transmitted on the same frequency as the frequency, on which the PCRS is transmitted, as a result of checking the transmission location of the DM-RS, the processor controls to enable a sequence of the PCRS to equally use a sequence of a DM-RS transmitted on a frequency closest to the frequency on which the PCRS is transmitted.

Advantageous Effects

This specification has an effect capable of minimizing a phase noise or a Doppler impact by transmitting a PCRS in consideration of a transmission location of a demodulation reference signal (DMRS).

This specification has an advantage of improving a performance of a reference signal (RS) by defining a PCRS so that a PCRS is transmitted through multiple frequency axes.

Effects obtainable from the present invention are not limited by the above-mentioned effect, and other effects which are not mentioned above can be clearly understood from the following description by those skilled in the art to which the present invention pertains.

DESCRIPTION OF DRAWINGS

The accompanying drawings, that are included to provide a further understanding of the invention and are incorporated in and constitute a part of this specification, illustrate embodiments of the invention and together with the description serve to explain various principles of the invention.

FIG. 1 illustrates a structure of a radio frame in a wireless communication system to which the present invention is applicable.

FIG. 2 illustrates a resource grid for one downlink slot in a wireless communication system to which the present invention is applicable.

FIG. 3 illustrates a structure of a downlink subframe in a wireless communication system to which the present invention is applicable.

FIG. 4 illustrates a structure of an uplink subframe in a wireless communication system to which the present invention is applicable.

FIG. 5 illustrates a reference signal pattern mapped to a downlink resource block pair in a wireless communication system to which the present invention is applicable.

FIG. 6 illustrates an example of a power spectral density of an oscillator.

FIG. 7 illustrates an example of a U-shaped Doppler spectrum.

FIG. 8 illustrates an example of reduced angular spread.

FIG. 9 illustrates an example of a Doppler spectrum in narrow beamforming.

FIG. 10 illustrates an example of a downlink synchronization signal service area of a base station.

FIG. 11 illustrates an example of an mmWave frame structure.

FIG. 12 illustrates an example of an OVSF code tree structure.

FIG. 13 illustrates an example of distribution of UEs.

FIG. 14 illustrates an example of a location on time and frequency axes of a PCRS proposed by this specification.

FIG. 15 illustrates another example of a location on time and frequency axes of a PCRS proposed by this specification.

FIG. 16 illustrates another example of a location on time and frequency axes of a PCRS proposed by this specification.

FIG. 17 illustrates another example of a location on time and frequency axes of a PCRS proposed by this specification.

FIG. 18 is a flow chart illustrating an example of a method for transmitting and receiving a PCRS proposed by this specification.

FIG. 19 is a block diagram illustrating a configuration of a wireless communication device to which the present invention is applicable.

MODE FOR INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General Wireless Communication System to which an Embodiment of the Present Invention May be Applied FIG. 1 shows the structure of a radio frame in a wireless communication system to which an embodiment of the present invention may be applied.

3GPP LTE/LTE-A support a type 1 radio frame structure capable of being applied to frequency division duplex (FDD) and a type 2 radio frame structure capable of being applied to time division duplex (TDD).

In FIG. 1, the size of the radio frame in a time domain is expressed in a multiple of a time unit "T_s=1/(15000*2048)." Downlink and uplink transmission includes a radio frame having an interval of T_f=307200*T_s=10 ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of T_slot=15360*T_s=0.5 ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure.

The type 2 radio frame structure includes 2 half frames each having a length of 153600*T_s=5 ms. Each of the half frames includes 5 subframes each having a length of 30720*T_s=1 ms.

In the type 2 radio frame structure of a TDD system, an uplink-downlink configuration is a rule showing how uplink and downlink are allocated (or reserved) with respect to all of subframes.

Table 1 shows the uplink-downlink configuration.

TABLE 1

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

EPDCCH (Enhanced PDCCH) carries the UE-specific (UE-specific) signaling. EPDCCH physical resource blocks is set to the UE-specific: located at (PRB physical resource block). In other words, as described above, the PDCCH but the first slot in the subframe to be sent in the previous maximum of three OFDM symbols, EPDCCH may be transmitted in the resource area other than the PDCCH. When the My EPDCCH subframe starts (i.e., symbol) can be set in the terminal through upper layer signaling (e.g., RRC signaling, and so on).

EPDCCH the transport format, resource allocation, and HARQ information, transport format, resource allocation, and HARQ information, and the resource allocation associated with the SL-SCH (Sidelink Shared Channel) and PSCCH (Physical Sidelink Control Channel) associated with the UL-SCH related to DL-SCH It can carry information. There are multiple EPDCCH of can be supported, the terminal may monitor a set of EPCCH.

EPDCCH CCE is one or more of the successive advancement: may be transmitted using a (ECCE enhanced CCE), a number of ECCE per single EPDCCH be determined for each EPDCCH format.

Each ECCE is a plurality of resource element groups: may be composed of (EREG enhanced resource element group). EREG is used to define the RE mapping by the ECCE. PRB and a 16 EREG there by pairs. Except for RE carry the DMRS in each PRB pairs, all the RE is a number from 0 to 15 in order to increase the next time in the order in which the frequency increases is given.

The UE may monitor the plurality of EPDCCH. For example, the UE can be one of PRB pairs within one or two EPDCCH set to monitor EPDCCH transmission setting.

Merging the different number of ECCE being can be realized (coding rate) different code rates for EPCCH. EPCCH may use the local transmission (localized transmission), or distributed transmission (distributed transmission), thereby PRB may be the mapping of ECCE vary within the RE.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 5 illustrates a reference signal pattern mapped to a downlink resource block pair in the wireless communication system to which the present invention can be applied.

Referring to FIG. 5, as a unit in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (see FIG. 5(a)) and a length of 12 OFDM symbols in the case of an extended cyclic prefix (CP) (see FIG. 5(b)). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule for mapping a CRS to a resource block is defined as follows.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l respectively denote a subcarrier index and a symbol index, and p denotes an antenna port. $N_{symb}^{DL}$ denotes the number of OFDM symbols in one downlink slot, and $N_{RB}^{DL}$ denotes the number of radio resources allocated to the downlink. ns denotes a slot index, and $N_{ID}^{cell}$ denotes a cell ID. mod denotes a modulo operation. A position of a reference signal varies depending on a value of $v_{shift}$ in a frequency domain. Since $v_{shift}$ depends on the cell ID, the position of the reference signal has various frequency shift values depending on the cell.

More specifically, in order to improve a channel estimation performance through a CRS, a position of the CRS may be shifted in a frequency domain depending on a cell. For example, when reference signals are located at an interval of three subcarriers, reference signals in one cell are allocated to 3k-th subcarriers, and reference signals in another cell are allocated to (3k+1)th subcarriers. In terms of one antenna port, reference signals are arranged at an interval of six resource elements in a frequency domain and are separated from a reference signal allocated to another antenna port at an interval of three resource elements.

In a time domain, reference signals are arranged at a constant interval starting from a symbol index '0' of each slot. A time interval is differently defined depending on the length of a cyclic prefix. In the case of normal cyclic prefix, reference signals are positioned at symbol indexes '0' and '4' of a slot. In the case of extended cyclic prefix, reference signals are positioned at symbol indexes '0' and '3' of a slot. A reference signal for an antenna port that has a maximum value among two antenna ports is defined in one OFDM symbol. Thus, in the case of transmission of four transmission antennas, reference signals for reference signal antenna ports '0' and '1' are positioned at the symbol indexes '0' and '4' of the slot (the symbol indexes '0' and '3' in the case of extended cyclic prefix), and reference signals for antenna ports '2' and '3' are positioned at the symbol index '1' of the slot. The positions of the reference signals for the antenna ports '2' and '3' in a frequency domain are changed with each other in a second slot.

The DRS is described in more detail below. The DRS is used to demodulate data. In the multi-input/output antenna transmission, a precoding weight used for a specific UE is used without change in order to estimate a channel combined with and corresponding to a transmission channel transmitted from each transmission antenna when the UE has received a reference signal.

The 3GPP LTE system (e.g., Release-8) supports up to four transmission antennas, and a DRS for rank 1 beamforming is defined. The DRS for rank 1 beamforming also indicates a reference signal for an antenna port index '5'.

A rule of mapping the DRS to a resource block is defined as follows. Equation 2 indicates the case of the normal cyclic prefix, and Equation 3 indicates the case of the extended cyclic prefix.

$$k = (k') \bmod N_{sc}^{RB} + N_{sc}^{RB} \cdot n_{PRB}$$ [Equation 2]

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB}$$ [Equation 3]

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 2 and 3, k and l respectively denote a subcarrier index and a symbol index, and p denotes an antenna port. $N_{sc}^{RB}$ denotes a size of a resource block in a frequency domain and is expressed as the number of subcarriers. $n_{PRB}$ denotes the number of physical resource blocks. $N_{RB}^{PUSCH}$ denotes a frequency band of a resource block for PDSCH transmission. ns denotes a slot index, and $N_{ID}^{cell}$ denotes a cell ID. mod denotes a modulo operation. A position of a reference signal varies depending on a value of $v_{shift}$ in a frequency domain. Since $v_{shift}$ depends on the cell ID, the position of the reference signal has various frequency shift values depending on the cell.

In an LTE-A system that is an evolved and developed form of an LTE system, a maximum of eight transmission antennas needs to be designed to be supported to the downlink of the base station. Thus, RSs for up to 8 transmission antennas also need to be supported. In the LTE system, since only RSs for up to four antenna ports are defined in a downlink RS, when the base station has four or more and up to eight downlink transmission antennas in the LTE-A system, RSs for antenna ports need to be additionally defined and designed. The RSs for up to eight transmission antenna ports each need to be designed as both an RS for channel measurement and an RS for data demodulation described above.

One of important considerations in designing the LTE-A system is backward compatibility, that is, that an LTE terminal needs to operate normally even in the LTE-A system with unstudied ease and the system also needs to support the backward compatibility. In terms of the RS transmission, in a time-frequency domain in which the CRS defined in the LTE is transmitted in a whole band every subframe, RSs for up to eight transmission antenna ports have to be additionally defined. In the LTE-A system, when RS patterns for up to eight transmission antennas are added to the whole band every subframe by the same method as a CRS of an existing LTE, RS overhead is excessively increased.

Accordingly, in the LTE-A system, a newly designed RS is roughly classified into two types that include an RS (CSI-RS: Channel State Information-RS, Channel State Indication-RS, etc.) for the purpose of the channel measurement for the selection of MCS, PMI, etc. and an RS (DMRS: Data Demodulation-RS) for the demodulation of data transmitted to eight transmission antennas.

The CSI-RS for the purpose of the channel measurement is characterized in that it is designed for the main purpose of channel measurement, unlike an existing CRS that is used for both the measurement, such as channel measurement and handover, and data demodulation. Naturally, the CSI-RS may also be used for the purpose of measurement such as handover. Since the CSI-RS is transmitted only for the purpose of obtaining information on a channel state, the CSI-RS may not be transmitted every subframe unlike the CRS. In order to reduce overhead of the CSI-RS, the CSI-RS is intermittently transmitted on the time axis.

The DMRS is dedicatedly transmitted to a UE which is scheduled in a corresponding time-frequency domain for the data demodulation. Namely, a DMRS of a specific UE is transmitted only to a region in which the corresponding UE has been scheduled, i.e., a time-frequency domain in which data is received.

In the LTE-A system, an eNB has to transmit CSI-RSs for all antenna ports. Because the transmission of CSI-RSs for up to eight transmission antenna ports every subframe has a disadvantage of too much overhead, the CSI-RS is not transmitted every subframe and has to be intermittently transmitted on the time axis, thereby reducing the overhead. Namely, the CSI-RS may be transmitted periodically at an integer multiple period of one subframe or transmitted in a specific transmission pattern. In this case, the period or the pattern in which the CSI-RS is transmitted may be configured by the eNB.

In order to measure the CSI-RS, the UE needs to be aware of information about a transmission subframe index of the CSI-RS, a CSI-RS resource element (RE) time-frequency position in a transmission subframe, and a CSI-RS sequence for each CSI-RS antenna port of a cell to which the UE itself belongs.

In the LTE-A system, the eNB has to transmit the CSI-RS to each of up to eight antenna ports. Resources used for the CSI-RS transmission of different antenna ports have to be orthogonal to each other. When one eNB transmits CSI-RSs for different antenna ports, the resources can be orthogonally allocated in the FDM/TDM scheme by mapping the CSI-RSs for the respective antenna ports to different REs. Alternatively, the CSI-RSs for the different antenna ports may be transmitted in a CDM scheme with being mapped to mutually orthogonal codes.

When the eNB notifies information on a CSI-RS to the UE in its own cell, the eNB first has to notify the UE of information about a time-frequency to which a CSI-RS for each antenna port is mapped. More specifically, the information includes subframe numbers to which the CSI-RS is transmitted or a period in which the CSI-RS is transmitted, a subframe offset to which the CSI-RS is transmitted, an OFDM symbol number to which the CSI-RS RE of a specific antenna is transmitted, a frequency spacing, an offset or a shift value of an RE in a frequency axis, and the like.

Phase Compensation Reference Signal (PCRS)

A PCRS is described in detail below.

DL PCRS Procedure

If the UE detects an xPDCCH with DCI format B1 or B2 in a subframe n intended for the UE, the UE receives a DL PCRS at a PCRS antenna port indicated in the DCI at the corresponding subframe.

UL PCRS Procedure

If a UE detects an xPDCCH with DCI format A1 or A2 in subframe n intended for the UE, the UE transmits UL PCRS in subframe n+4+m+1 using one or two PCRS antenna ports which are the same as an assigned DM-RS antenna port indicated in the DCI except the following conditions (Condition 1 and Condition 2).

Condition 1: If a dual PCRS field of the detected DCI is set to '1' and the number of DM-RS ports assigned to the xPDCCH is '1', the UE transmits the UL PCRS in the subframe n+4+m+1 using the assigned DM-RS antenna port indicated in the DCI and an additional PCRS antenna port having the same subcarrier position as a specific PCRS antenna port Condition 2: A relative transmit power ratio of the PCRS and the xPUSCH is determined by a transmission scheme defined by the following Table 3.

Table 3 indicates an example of a relative transmit power ratio of PCRS and xPUSCH on a given layer.

TABLE 3

| Transmission Scheme | Relative Transmit Power Ratio |
| --- | --- |
| Single-layer transmission | 3 dB |
| Two-layer transmission | 6 dB |

The PCRS is described in more detail below.

The PCRS associated with the xPUSCH (1) is transmitted on an antenna port p $p \in \{40,41,42,43\}$, (2) exists and is a valid criterion for phase noise compensation only if a xPUSCH transmission is associated with a corresponding antenna port, and (3) is transmitted only on physical resource blocks and symbols to which a corresponding xPUSCH is mapped.

Sequence Generation

For any of antenna ports $p \in \{40,41,42,43\}$, a reference signal sequence r(m) is defined by the following Equation 4.

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, \lfloor N_{RB}^{max,UL}/4 \rfloor - 1$$

[Equation 4]

A pseudo-random sequence c(i) is defined by a gold sequence of length-31, and a pseudo-random sequence generator is initialized at the start of each subframe as in the following Equation 5.

$$c_{init} = (\lfloor n_s/2 \rfloor + 1) \cdot (2n_{ID}^{(nSCID)} + 1) \cdot 2^{16} + n_{SCID}$$

[Equation 5]

$n_{ID}^{(i)}$ quantity (i=0,1) is given below.

$n_{ID}^{(i)} = n_{ID}^{(cell)}$, if no value for $n_{ID}^{(PCRS,i)}$ is provided by higher layers.

$n_{ID}^{(i)} = n_{ID}^{(PCRS,i)}$, if any value for $n_{ID}^{(PCRS,i)}$ is provided by higher layers.

A value of $n_{SCID}$ is zero unless otherwise specified. For a xPUSCH transmission, $n_{SCID}$ is given by a DCI format related to the xPUSCH transmission.

Mapping to Resource Elements

For antenna ports $p \in \{40,41,42,43\}$, in a physical resource block with a frequency domain index $n_{PRB}$ assigned for the corresponding xPUSCH transmission, a part of the reference signal sequence r(m) is mapped to complex-value modification symbols $a_{k,l}^{(p)}$ for corresponding xPUSCH symbols in a subframe according to $a_{k,l}^{(p)} = r(k'')$.

For a start physical resource block index $n_{PRB}^{xPUSCH}$ of xPUSCH physical resource allocation and the number $N_{PRB}^{xPUSCH}$ of xPUSCH physical resource blocks, resource elements (k,l') in one subframe are given by the following Equation 6.

$$k = N_{sc}^{RB} \cdot (n_{PRB}^{xPUSCH} + k'' \cdot 4) + k'$$

$$k' = \begin{cases} 16 & p \in \{40, 41\} \\ 31 & p \in \{42, 43\} \end{cases}$$

$$k'' = \lfloor m'/4 \rfloor$$

$$l' = \begin{cases} \{l' \mid l' \in \{3, \ldots, l_{last}^{xPUSCH}\} \text{ and } l' \text{ is an odd number}\}, & p \in \{40 + m'', 42 + m''\} \\ \{l' \mid l' \in \{3, \ldots, l_{last}^{xPUSCH}\} \text{ and } l' \text{ is an even number}\}, & p \in \{41 - m'', 43 - m''\} \end{cases}$$

$$m' = 0, 1, 2, \ldots, N_{PRB}^{xPUSCH} - 1$$

$$m'' = \lfloor m'/4 \rfloor \bmod 2$$

[Equation 6]

In Equation 6, m'=0, 1, 2, . . . , $N_{PRB}^{xPUSCH}$, 'l' denotes a symbol index in one subframe, and $l'_{last}^{xPUSCH}$ denotes a last symbol index of xPUSCH in a given subframe.

Resource elements (k, l') used for transmission of a UE-specific PCRS from one UE on any antenna port in a set S are not used for transmission of xPUSCH on any antenna port in the same subframe.

Here, S is {40}, {41}, {42}.

Carrier Frequency Offset (CFO) Effect

A baseband signal transmitted from a transmitter (e.g., base station) transitions to a passband by a carrier frequency generated in an oscillator, and a signal transmitted through the carrier frequency is converted to the baseband signal by the same carrier frequency at a receiver (e.g., UE).

In this case, a signal received by the receiver may include a distortion related to the carrier.

An example of the distortion may include a distortion phenomenon caused by a difference between a carrier frequency of the transmitter and a carrier frequency of the receiver.

This carrier frequency offset occurs because the oscillators used in the transmitter and the receiver are not the same or Doppler frequency shift occurs depending on a movement of the UE.

A Doppler frequency is proportional to a moving speed of the UE and the carrier frequency and is defined by the following Equation 7.

$$f_d = \frac{v \cdot f_c}{c} \quad \text{[Equation 7]}$$

In Equation 7, $f_c$, $f_d$, v, c denote the carrier frequency, the Doppler frequency, the moving speed of the UE, and a speed of light, respectively.

Further, a normalized carrier frequency offset (E) is defined by the following Equation 8.

$$\varepsilon = \frac{f_{offset}}{\Delta f} \quad \text{[Equation 8]}$$

In Equation 8, $f_{offset}$, $\Delta f$, $\varepsilon$ denote a carrier frequency offset, a subcarrier spacing, and a carrier frequency offset normalized at a subcarrier spacing, respectively.

When the carrier frequency offset is present, a received signal of the time domain is a result of multiplying a transmitted signal by a phase rotation, and a received signal of the frequency domain is a result of shifting a transmitted signal in the frequency domain.

In this case, the received signal is affected by all of other subcarrier(s), and inter-carrier-interference (ICI) occurs.

That is, when a fractional carrier frequency offset occurs, the received signal of the frequency domain is represented by the following Equation 9.

Equation 9 indicates a received signal with the CFO in the frequency domain.

$$Y_l[k] = e^{j\pi\varepsilon(N-1)/N}\left\{\frac{\sin \pi\varepsilon}{N \sin (\pi\varepsilon/N)}\right\}H_l[k]X_l[k] + I_l[k] + Z[k] \quad \text{[Equation 9]}$$

In Equation 9, k,l,N,Y[·],X[·],H[·],I[·],Z[·] denote a subcarrier index, a symbol index, a FFT size, a received signal, a transmitted signal, a frequency response, ICI resulting from the CFO, a white noise, respectively.

As defined by the above Equation 9, if the carrier frequency offset is present, an amplitude and a phase of a k-th subcarrier may be distorted, and interference due to adjacent subcarriers may occur.

If the carrier frequency offset is present, the interference due to adjacent subcarriers may be given by the following Equation 10.

Equation 10 indicates the ICI caused by the CFO.

$$I_l[k] = e^{j\pi\varepsilon(N-1)/N} \quad \text{[Equation 10]}$$

$$\sum_{\substack{m=0 \\ m \neq k}}^{N-1} H[m]X_l[m]\left\{\frac{\sin \pi\varepsilon}{N \sin (\pi(m-k+\varepsilon)/N)}\right\}e^{-j\pi(m-k)/N}$$

Phase Noise Effect

As described above, a baseband signal transmitted from the transmitter transitions to a passband by a carrier frequency generated in an oscillator, and a signal transmitted through the carrier frequency is converted to the baseband signal by the same carrier frequency at the receiver.

A signal received by the receiver may include a distortion related to the carrier.

An example of the distortion may include a phase noise generated due to unstable characteristics of the oscillator used in the transmitter and the receiver.

The phase noise refers to that a frequency varies with time around a carrier frequency.

The phase noise is modeled as a Wiener process as a random process with an average of zero and affects an OFDM system.

As illustrated in FIG. 6 below, the phase noise tends to increase its influence as the frequency of the carrier increases.

The phase noise tends to determine its characteristics depending on the same power spectral density as the oscillator.

FIG. 6 illustrates an example of a power spectral density of an oscillator.

A distortion phenomenon of a signal resulting from the phase noise as described above is represented as a common phase error (CPE) and an inter-carrier interference (ICI) in an OFDM system.

The following Equation 11 indicates an influence of the phase noise on a received signal of the OFDM system. That is, the following Equation 11 indicates a received signal with the phase noise in the frequency domain.

$$Y_l(k) = X_l(k)H_l(k)I_l(0) + ICI_l(k) + Z_l(k) \quad \text{[Equation 11]}$$

$$\text{where } ICI_l(k) = \sum_{m=0, m \neq k}^{N-1} X_l(m)H_l(m)I_l(m-k)$$

$$\text{and } I_l(p) = \frac{1}{N}\sum_{n=0}^{N-1} e^{j\left[\frac{2\pi pn}{N}+\phi_l(n)\right]}$$

In the above Equation 11, k,l,N,Y(·),X(·),H(·),I(·),Z(·) denotes a subcarrier index, a symbol index, a FFT size, a received signal, a transmitted signal, a frequency response, a common phase error resulting from the phase noise, inter-carrier interference resulting from the phase noise, a white noise, phase rotation resulting from the phase noise, respectively.

Doppler in mmWAVE Band

An ultrahigh frequency wireless communication system is configured such that a center frequency operates at several GHz to several tens of GHz, unlike an existing wireless communication system.

Ultrahigh frequency characteristics of the center frequency make worse a Doppler effect appearing according to a movement of the UE or an impact of a carrier frequency offset (CFO) generated by an oscillator error between the UE and the base station.

In this instance, the Doppler effect has a characteristic of linearly increasing in response to the center frequency. The system, and may be referred to as normalized CFO and may be expressed as carrier frequency (Hz)/subcarrier spacing in a mathematical equation.

The following Table 5 shows an example of CFO values depending on each center frequency and the offset value.

TABLE 5

| Center frequency | Oscillator Offset | | | |
|---|---|---|---|---|
| (subcarrier spacing) | ±0.05 ppm | ±0.1 ppm | ±10 ppm | ±20 ppm |
| 2 GHz (15 kHz) | ±100 Hz(±0.0067) | ±200 Hz(±0.0133) | ±20 kHz(±1.3) | ±40 kHz(±2.7) |
| 30 GHz (104.25 kHz) | ±1.5 kHz(±0.014) | ±3 kHz(±0.029) | ±300 kHz(±2.9) | ±600 kHz(±5.8) |
| 60 GHz (104.25 kHz) | ±3 kHz(±0.029) | ±6 kHz(±0.058) | ±600 kHz(±5.8) | ±1.2 MHz(±11.5) |

CFO generated by the oscillator error between the UE and the base station is indicated in a ppm ($=10^{-6}$) and also has a characteristic of linearly increasing in response to the center frequency.

In an existing cellular network system, in order to solve a problem of the CFO described above, the base station transmits a synchronization channel, a pilot signal, or a reference symbol to the UE, and the UE estimates or compensates the CFO using them.

Accordingly, in the ultrahigh frequency wireless communication system, a synchronization channel has to be transmitted in a different way, in order to estimate (or compensate) the CFO of which an offset value is greater than an offset value of the existing wireless communication system.

In an existing LTE/LTE-A system, an error value of oscillators between the use of the UE and the base station is defined by requirements as follows.

UE side frequency error (TS. 36.101)

The UE modulated carrier frequency needs to be accurate to within ±0.1 PPM observed over a period of one time slot (0.5 ms) compared to a carrier frequency received from the E-UTRA Node B.

eNB side frequency error (TS. 36.104)

The frequency error is the measure of a difference between an actual BS transmit frequency and an assigned frequency.

The following Table 4 shows an example of oscillator accuracy according to a class of the base station.

TABLE 4

| BS class | Accuracy |
|---|---|
| Wide Area BS | ±0.05 ppm |
| Local Area BS | ±0.1 ppm |
| Home BS | ±0.25 ppm |

Accordingly, a maximum difference of oscillators between the base station and the UE is ±0.1 ppm. If an error has occurred in one direction, it may have a maximum offset value of 0.2 ppm.

A mathematical equation for converting the value of ppm into a unit of Hz suitable for each center frequency may be given by center frequency*frequency offset (ppm).

In the OFDM system, an impact of a CFO value may vary depending on a subcarrier spacing.

In general, the OFDM system having a large subcarrier spacing is less affected by even a large CFO value.

Therefore, an actual CFO value (absolute value) needs to be expressed as a relative value that affects the OFDM system, and may be referred to as normalized CFO and may be expressed as carrier frequency (Hz)/subcarrier spacing in a mathematical equation.

Table 5 indicates CFO value and normalized CFO for each center frequency and an error value of an oscillator.

It was assumed that a subcarrier spacing used in LTE Rel-8/9/10 was 15 kHz when a center frequency was 2 GHz. It was assumed that subcarrier spacings at the center frequencies of 30 GHz and 60 GHz were 104.25 kHz so that performance degradation was avoided considering the Doppler effect for each center frequency.

However, Table 5 is merely an example, and it will be apparent that other subcarrier spacings may used for each center frequency.

A Doppler spread phenomenon is greatly affected in a situation where the UE moves at high speed or moves at low speed in a high frequency band.

Doppler spread causes spread in a frequency domain, and as a result generates distortion of a signal.

The Doppler spread may be represented by the following Equation 12.

$$f_{doppler} = (V/\lambda)\cos\theta \quad \text{[Equation 12]}$$

In Equation 12, v denotes a moving speed of the UE, and λ denotes a wavelength of a center frequency of a radio wave the base station or the UE transmits.

Further, θ denotes an angle between the received radio wave and a moving direction of the UE.

Hereinafter, description will be given on the assumption that θ is '0'.

In this case, a coherence time $T_c$ has a relationship of the following Equation 13.

$$T_c \approx \frac{1}{f_{doppler}} \quad \text{[Equation 13]}$$

If the coherence time is defined as a time spacing in which a correlation value of a channel response in a time domain is 50% or more, the coherence time $T_c$ may be represented by the following Equation 14.

$$T_c \approx \frac{9}{16\pi f_{doppler}} \quad \text{[Equation 14]}$$

The wireless communication system mainly uses a relationship between the coherence time and the Doppler spread using a geometric mean of the above two Equations as in the following Equation 15.

$$T_c = \sqrt{\frac{9}{16\pi f_{doppler}}} = \frac{0.423}{f_{doppler}} \quad \text{[Equation 15]}$$

Such a Doppler power spectrum density (hereinafter referred to as Doppler spectrum) may have various shapes.

Generally, if signals received by the UE are received at the same power in all directions in a rich scattering environment such as downtown area, the Doppler spectrum is indicated in the U-shape as shown in FIG. 7.

FIG. 7 illustrates an example of a U-shaped Doppler spectrum.

A U-shaped Doppler spectrum when a center frequency is fc and a maximum Doppler spread value is fd may be given by FIG. 7.

In the ultrahigh frequency wireless communication system, since the center frequency is located at a very high band, there is an advantage that a size of an antenna is small and several antennas can be installed in a small space.

The advantage enables pin-point beamforming (may be referred to as pencil beamforming, narrow beamforming, or sharp beamforming) using several tens to several hundreds of antennas.

The narrow beamforming means that a received signal is not received in a constant direction and is received only at a certain angle.

FIG. 8 illustrates a concept when an existing Doppler spectrum performs narrow beamforming using multiple U-shaped antennas of a signal received in a constant direction.

In other words, FIG. 8 illustrates an example of reduced angular spread.

As described above, due to the reduced angular spread when the narrow beamforming has been performed, the Doppler spectrum does not have the U-shape and has Doppler spread only at a certain band.

FIG. 9 illustrates a Doppler spectrum when narrow beamforming has been performed or when a signal received by a receiver (or UE) is not incident in a constant direction and has been incident only at a narrow angle.

FIG. 9 illustrates an example of a Doppler spectrum in narrow beamforming.

Beamforming/Multi-Level Repetition Based Synchronization Signal

The UE performs timing and frequency synchronization with a corresponding base station using a (downlink) synchronization signal transmitted by the base station.

At this time, the base station transmits a downlink synchronization signal with as wide beam width as possible, so that all of UEs within a specific cell can use the synchronization signal.

If the base station transmits a (downlink) synchronization signal using a high frequency (e.g., mmWave) band, the synchronization signal experiences larger path attenuation than a synchronization signal using a low frequency band.

Namely, in case of a system transmitting a downlink synchronization signal using a high frequency band, a supportable cell radius of the system is greatly reduced compared to an existing cellular system (e.g., LTE) using a relatively low frequency band (under 6 GHz).

One method for solving the reduction of the cell radius is to transmit a (downlink) synchronization signal using a beamforming scheme.

In this case, a cell radius increases, but a beam width decreases.

The following Equation 16 indicates change in a received SINR (Signal to Interference Noise Ratio) depending on a beam width.

$$W \rightarrow M^{-2}W$$

$$\text{SINR} \rightarrow M^2 \text{SINR} \quad \text{[Equation 16]}$$

The above Equation 16 shows that if a beam width is reduced by $M^{-2}$ times an existing beam width, the received SINR is improved by $M^2$ times.

Another method is to repeatedly transmit the same downlink synchronization signal several times.

In this case, while additional resource allocation is necessary on a time axis, a cell radius can be increased while maintaining a beam width as it is.

One base station schedules a frequency resource and a time resource shared by UEs present in a specific area and allocates them to each UE.

Hereinafter, the specific area is defined as 'sector'.

FIG. 10 illustrates an example of a downlink synchronization signal service area of a base station.

Namely, FIG. 10 illustrates a specific area, i.e., a sector.

Referring to FIG. 10, A1, A2, A3, and A4 denote sectors having widths of 0'-15', 15'-30', 30'-45' and 45'-60' in a radius of 0 to 200 m, respectively.

Further, B1, B2, B3, and B4 denote sectors having widths of 0'-15', 15'-30', 30'-45' and 45'-60' in a radius of 200 m to 500 m, respectively.

Based on this, Sector I and Sector II are defined as follows.

Sector I: A1, A2, A3, A4

Sector II: A1, A2, A3, A4, B1, B2, B3, B4

It is assumed that a service area of an existing downlink synchronization signal is Sector I.

Further, in order to service the Sector II, assume that a power of the synchronization signal has to additionally increase to 6 dB or more.

First, if an additional gain of 6 dB is provided using a beamforming scheme, a service radius can be extended from A1 to B1.

However, because a beam width is reduced, A2, A3, and A4 cannot be serviced simultaneously.

Thus, A2-B2, A3-B3, and A4-A4 have to be serviced next.

Namely, in order to service the Sector II, the downlink synchronization signal has to be transmitted while changing a beam direction four times.

On the other hand, if the repetitive transmission of the synchronization signal is used, the whole Sector II can be serviced simultaneously. However, the same four synchronization signals need to be transmitted on the time axis.

As a result, a resource required to service all the above sectors is identical for the two methods.

Because a beam width is narrow in the former method, the UE may miss a synchronization signal when the UE moves fast or is located at each sector boundary.

However, if the UE can identify an ID of a beam transmitted to each sector, the UE can grasp which sector the UE has been located in through the synchronization signal.

On the other hand, because a beam having a wide beam width is used in the latter method, it is less probable that the UE misses a synchronization signal. Instead, the UE cannot grasp which sector the UE has been located in.

mmWave Frame Structure

FIG. 11 illustrates an example of an mmWave frame structure.

Referring to FIG. 11, one frame is composed of Q subframes, and one subframe is composed of P slots.

Further, the slot is composed of T OFDM symbols.

In this instance, unlike other subframes, a first subframe uses 0th slot for the usage of synchronization.

The S slot is composed of A OFDM symbols for timing and frequency synchronization, B OFDM symbols for beam scanning, and C OFDM symbols for informing the UE of system information.

Remaining D OFDM symbols are used for data transmission to each UE.

Existing Timing Synchronization Algorithm

In FIG. 11, assume that the base station repeatedly transmits the same signal A times.

Based on the synchronization signal repeatedly transmitted by the base station, the UE performs timing synchronization using the following two algorithms.

The following Equation 17 indicates an example of a timing synchronization algorithm based on a correlation of received signals.

$$\hat{n} = \arg\max_{\tilde{n}} \frac{\left|\sum_{i=0}^{A-2} y_{\tilde{n},i}^H y_{\tilde{n},i+1}\right|}{\sum_{i=0}^{A-2} |y_{\tilde{n},i}^H y_{\tilde{n},i+1}|} \qquad \text{[Equation 17]}$$

where $y_{\tilde{n},i} = r[\tilde{n} + i(N + N_g) : \tilde{n} + i(N + N_g) + N - 1]$ In the above Equation 17, N, $N_g$, i denote a length of an OFDM symbol, a length of Cyclic Prefix, and an index of the OFDM symbol, respectively.

Further, r means a received signal vector.

Here, $y_{\tilde{n},i} = r[\tilde{n}+i(N+N_g):\tilde{n}+i(N+N_g+N-1]$ is a vector defined with elements from $\tilde{n}+i(N+N_g)$-th element to $\tilde{n}+i(N+N_g)+N-1$-th element of the received signal vector r.

The timing synchronization algorithm of Equation 17 operates on the assumption that two temporally adjacent OFDM received signals are equal to each other.

Since the algorithm can use a sliding window scheme, it can be implemented with low complexity and has a property robust to a frequency offset.

The following algorithm performs timing synchronization using a correlation between a received signal and a signal transmitted by the base station.

The following Equation 18 indicates an example of a timing synchronization algorithm based on a correlation between a received signal and a transmitted signal.

$$\hat{n} = \arg\max_{\tilde{n}} \frac{\left|\sum_{i=0}^{A-1} y_{\tilde{n},i}^H s\right|^2}{\sum_{i=0}^{A-1} |y_{\tilde{n},i}|^2 \sum_{i=0}^{A-1} |s|^2} \qquad \text{[Equation 18]}$$

In the above Equation 18, S means a signal transmitted by the base station and is a signal vector promised in advance between the UE and the base station.

The scheme indicated in Equation 18 has a performance better than the scheme indicated in Equation 17.

However, since the scheme of Equation 18 cannot be implemented by the sliding window scheme, it requires high complexity.

In addition, the scheme of Equation 18 has a property vulnerable to a frequency offset.

Beam Scanning

Beam scanning indicates an operation of a transmitter or a receiver that finds a direction of a beam maximizing a received SINR of the receiver.

For example, the base station determines a direction of a beam through the beam scanning before transmitting data to the UE.

The description related to the beam scanning is briefly given below.

FIG. 10 shows that one sector serviced by one base station is divided into a total of 8 areas.

Here, it is assumed that an area of each beam transmitted by the base station is (A1–B1)/(A2–B2)/(A3–B3)/(A4–B4).

Further, it is assumed that the UE can identify the beams transmitted by the base station.

Based on this, the beam scanning can be specified as follows.

The base station transmits beams to (A1–B1)/(A2–B2)/(A3–B3)/(A4–B4) in sequence.

(1) The UE finds a best beam among the beams in terms of a received SINR.

(2) The UE feeds back the found beam to the base station.

(3) The base station transmits data using a beam with a direction of the feedback.

(4) Consequently, the UE can receive data from a beam having a maximized received SINR.

Zadoff-Chu (ZC) Sequence

Zadoff-Chu sequence is called Chu sequence or ZC sequence.

Hereinafter, Zadoff-Chu sequence is commonly called 'ZC sequence'.

The ZC sequence is defined by the following Equation 19.

$$x_r[n] = e^{\frac{j\pi r n(n+1)}{N}} \qquad \text{[Equation 19]}$$

In the above Equation 19, N denotes a sequence length, r denotes a root value, and $x_r[n]$ denotes an n-th element of the ZC sequence.

The ZC sequence has the following three important properties.

(1) All elements of the ZC sequence are the same in size (Constant Amplitude).

A DFT result of the ZC sequence is also identical for the sizes of all elements.

(2) A correlation between the ZC sequence and a cyclic shift version of the ZC sequence is given by the following Equation 20.

$$(x_r^{(i)})^H x_r^{(j)} = \begin{cases} N & \text{for } i = j \\ 0 & \text{elsewhere} \end{cases} \qquad \text{[Equation 20]}$$

In Equation 20, $x_r^{(i)}$ is defined as a sequence obtained by cyclic shifting $x_r$ by i.

The above Equation 20 indicates that auto-correlation of the ZC sequence is zero except when i=j. (Zero Auto-Correlation)

The ZC sequence is also called CAZAC sequence because it has Constant Amplitude Zero Auto-Correlation properties.

(3) A correlation between ZC sequences having root values, which are coprime to a length N, is given by the following Equation 21.

$$x_{r_1}^H x_{r_2} = \begin{cases} N & \text{for } r_1 = r_2 \\ \dfrac{1}{\sqrt{N}} & \text{elsewhere} \end{cases} \qquad \text{[Equation 21]}$$

In Equation 21, $r_1$, $r_2$ are coprime to N.

For example, when N=111, $2 \le r_1, r_2 \le 110$ always satisfies the above Equation 21.

Unlike the auto-correlation of Equation 20, a mutual correlation of ZC sequence does not become zero completely.

Hadamard Matrix

Hadamard matrix is defined by the following Equation 22.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \qquad \text{[Equation 22]}$$

where $H_1 = [1]$ $$H_2 = \begin{bmatrix} 1 & 1 \\ 1 & -1 \end{bmatrix}$$

In Equation 22, $2^k$ denotes a size of a matrix.

Hadamard matrix always satisfies $H_n H_n^T = nI_n$ regardless of size n.

Namely, Hadamard matrix is a Unitary matrix, and all columns (rows) are orthogonal to each other.

For example, when n=4, Hadamard matrix is defined by the following Equation 23.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \qquad \text{[Equation 23]}$$

In the matrix of the above Equation 23, it can be confirmed that columns are orthogonal to each other.

Orthogonal Variable Spreading Factor (OVSF) Code

An OVSF code is based on Hadamard matrix and is generated according to the following rule.

When the OVSF code branches to the right (lower branch), a first code repeats an upper code (mother code) as it is twice, and a second code repeats the upper code as it is once, inverts the upper code, and then repeats the inverted upper code once.

FIG. 12 illustrates an example of an OVSF code tree structure.

That is, the OVSF code has the following properties.

(1) The orthogonality is secured except a relationship between a mother code and a child code that are immediately adjacent on a code tree.

In FIG. 12, [1 −1 1 −1] is orthogonal to [1 1], [1 1 1 1], and [1 1 −1 −1].

(2) A length of a code is the same as the number of available codes.

FIG. 12 illustrates that a length of a code is the same as the total number of branches to which a corresponding code belongs.

Random Access Channel (RACH)

Transmit Power Control of RACH Signal

In case of LTE system, when RACH signals transmitted by a plurality of UEs arrive at the base station, the RACH signals of the UEs received by the base station need to have the same power.

To this end, the base station defines a parameter 'preambleInitialReceivedTargetPower' and broadcasts the parameter to all UEs within a corresponding cell through SIB2.

The UE calculates a path loss using a reference signal and determines a transmit power of the RACH signal using the calculated path loss and the parameter 'preambleInitialReceivedTargetPower' as in the following Equation 24.

$$P\_PRACH\_Initial = \min \{P\_CMAX, \text{preambleInitial-} \\ \text{ReceivedTargetPower} + PL\} \qquad \text{[Equation 24]}$$

In Equation 24, P_PRACH_Initial, P_CMAX, and PL denote a transmit power of the RACH signal, a maximum transmit power of the UE, and a path loss, respectively.

For example, a maximum transmittable power of the UE is assumed as 23 dBm.

An RACH receive power of the base station is assumed as −104 dBm.

It is assumed that the UE has been located as shown in FIG. 13.

Namely, FIG. 13 illustrates an example of distribution of UEs.

First, the UE calculates a path loss using a received synchronization signal and a beam scanning signal and then determines a transmit power based on the calculation.

The following Table 6 shows a path loss and a transmit power of each UE.

TABLE 6

| UE | preambleInitialReceivedTargetPower | Path loss | Necessary transmit power | Transmit power | Additional necessary power |
|---|---|---|---|---|---|
| K1 | −104 dBm | 60 dB | −44 dBm | −44 dBm | 0 dBm |
| K2 | −104 dBm | 110 dB | 6 dBm | 6 dBm | 0 dBm |
| K3 | −104 dBm | 130 dB | 26 dBm | 23 dBm | 3 dBm |

In Table 6, in case of a UE K1, although a path loss is very small, the UE K1 transmits an RACH signal with very small power (−44 dBm) in order to match an RACH receive power.

In case of a UE K2, although a path loss is large, the UE K2 may transmit an RACH signal with a necessary transmit power of 6 dBm.

However, in case of a UE K3, since a path loss is very large, a necessary transmit power exceeds P_CMA=23 dBm.

In this case, because the UE has to perform a transmission with 23 dBm, an RACH access success rate of the corresponding UE is reduced by 3 dB.

Phase Noise

A jitter on a time axis is defined as a phase noise on a frequency axis.

The phase noise changes with a time dependent correlation, and this is represented as a common phase error (CPE).

Hereinafter, various embodiments of a PCRS for compensating a phase noise and a Doppler impact proposed by this specification are described in detail.

In each embodiment, signaling related to a DM-RS is as follows.

Namely, the base station transmits transmission information of DL-SCH for the UE to the UE via DCI or RRC signaling.

Here, the transmission information of DL-SCH may include a precoding scheme, a number of transmission ranks, an MCS level, etc.

The UE checks a transmission scheme of DL-SCH based on information of the DCI or RRC signaling received from the base station.

The UE can implicitly check a location of a DM-RS for demodulation of a DL-SCH symbol based on the transmission scheme of DL-SCH.

This is because a location of a DM-RS for each transmission scheme is promised in advance between a transmitter (e.g., base station) and a receiver (e.g., UE).

A PCRS proposed by each of the following embodiments may be defined based on the DM-RS.

First Embodiment

A first embodiment provides a method of reusing as it is a demodulation reference signal (DM-RS) located on the same frequency axis as a reference signal used for compensating a phase noise and a Doppler impact.

In this specification, a reference signal used for compensating a phase noise and a Doppler impact is called or represented as 'Phase noise Compensation Reference Signal is (PCRS)'.

FIG. 14 illustrates an example of a location on time and frequency axes of a PCRS proposed by this specification.

Namely, FIG. 14 illustrates a method of reusing as it is a DM-RS located on the same frequency axis as described above when defining a PCRS.

In other words, FIG. 14 illustrates an example of a method of utilizing a DM-RS located on the same frequency axis as a PCRS.

Referring to FIG. 14, a sequence of a PCRS can reuse as it is a sequence of a DM-RS located on the same frequency axis as a frequency axis on which the PCRS is defined.

In FIG. 14, Type I indicates a structure in which a PCRS is not transmitted on all symbols and is transmitted on a time axis at intervals of one symbol, and Type II indicates a structure in which a PCRS is transmitted over all symbols on a time axis.

It can be seen that the PCRS uses different frequency axis resources according to an antenna port.

Further, it can be seen that the PCRS equally uses a DM-RS used in subcarrier indices '5' and '6' of a third symbol (symbol #2) and is transmitted at intervals of one symbol or over all the symbols from after a symbol, to which the DM-RS is transmitted.

Further, it can be seen that a PCRS transmitted through an antenna port '0' is transmitted on a frequency axis corresponding to the subcarrier index '5', and a PCRS transmitted through an antenna port '1' is transmitted on a frequency axis corresponding to the subcarrier index '6'.

Second Embodiment

Next, a second embodiment provides a method for transmitting a PCRS when a DM-RS is not located on the same frequency axis as a frequency axis on which the PCRS is transmitted.

If a DM-RS is not present on the same frequency axis as a frequency axis on which a PCRS is transmitted, the PCRS reuses as it is a DM-RS located on a frequency axis closest to the frequency axis on which the PCRS is transmitted.

The DM-RS may be defined, or located, or transmitted at certain intervals on the frequency axis in consideration of a coherence bandwidth, a reference signal overhead, etc.

In this case, in the PCRS, directly mapped DM-RSs may not be present on the frequency axis.

FIG. 15 illustrates another example of a location on time and frequency axes of a PCRS proposed by this specification.

Accordingly, if a DM-RS is not present on the same frequency axis as a frequency axis on which a PCRS is transmitted, the PCRS reuses as it is a DM-RS closest to the frequency axis.

It can be seen from FIG. 15 that a PCRS corresponding to an antenna port '0' reuses as it is a DM-RS sequence located on #4 frequency axis (or subcarrier index '4'), and a PCRS corresponding to an antenna port '1' reuses as it is a DM-RS sequence located on #5 frequency axis.

In FIG. 15, Type I indicates a structure in which a PCRS is not transmitted on all symbols and is transmitted on a time axis at intervals of one symbol, and Type II indicates a is structure in which a PCRS is transmitted over all symbols on a time axis.

Here, it is assumed that the PCRS is transmitted after the DM-RS transmission.

It can be seen that the PCRS uses different frequency axis resources according to an antenna port.

Further, it can be seen that the PCRS equally uses a DM-RS used in subcarrier indices '5' and '6' of a third symbol (symbol #2) and is transmitted at intervals of one symbol or over all the symbols from after a symbol, to which the DM-RS is transmitted.

Third Embodiment

Next, a third embodiment provides a method of defining and using all PCRSs, that are assigned to all resources and compensate for a phase noise and a Doppler impact, as the same specific complex value.

As described above, when a common phase error (CPE) or a carrier frequency offset (CFO) is estimated using the PCRSs, there is an advantage that the UE can omit a descrambling process if data of contiguous resource elements on a time axis is the same.

Accordingly, in order to utilize the above advantage, the third embodiment provides a method of defining all PCRSs assigned to all resources as the same specific complex value.

FIG. 16 illustrates another example of a location on time and frequency axes of a PCRS proposed by this specification.

Referring to FIG. 16, $S_0$ and $S_1$ mean the same complex value defined in a PCRS of an antenna port '0' and the same complex value defined in a PCRS of an antenna port '1', respectively.

Namely, a PCRS transmitted on the antenna port '0' equally uses a complex value used in a symbol #2 and a subcarrier index #5 in a symbol to which a subsequent PCRS is transmitted, and a PCRS transmitted on the antenna port '1' equally uses a complex value used in the symbol #2 and a subcarrier index #6 in a symbol to which a subsequent PCRS is transmitted.

In FIG. 16, Type I indicates a structure in which a PCRS is not transmitted on all symbols and is transmitted on a time axis at intervals of one symbol, and Type II indicates a structure in which a PCRS is transmitted over all symbols on a time axis.

It can be seen that the PCRS uses different frequency axis resources (subcarrier indices #5 and #6) according to an antenna port.

Further, it can be seen that the PCRS equally uses a DM-RS used in subcarrier indices '5' and '6' of a third symbol (symbol #2) and is transmitted at intervals of one symbol or over all the symbols from after a symbol, to which the DM-RS is transmitted.

Further, it can be seen that a PCRS transmitted on the antenna port '0' is transmitted on a frequency axis corresponding to the subcarrier index '5', and a PCRS transmitted on the antenna port '1' is transmitted on a frequency axis corresponding to the subcarrier index '6'.

Fourth Embodiment

Next, a fourth embodiment provides a method of defining PCRSs for several resource elements of frequency axes on the same time axis using different sequences or different specific values, copying the same value of the same frequency axis onto different time axes, and reusing a PCRS.

When a common phase error (CPE) or a carrier frequency offset (CFO) is estimated using a PCRS, there is an advantage that the UE can omit a descrambling process if data of contiguous resource elements on a time axis is the same.

Further, there is an advantage that a performance of a reference signal can be improved by defining each of PCRSs on several frequency axes.

As a method for utilizing the advantages, the fourth embodiment provides a method of defining several resource elements of frequency axes on the same time axis using a gold sequence, copying the same gold sequence onto a different time axis, and reusing the PCRS.

FIG. 17 illustrates another example of a location on time and frequency axes of a PCRS proposed by this specification.

Namely, FIG. 17 illustrates an example of a PCRS defined using a specific complex value on multiple frequency axes.

Referring FIG. 17, $S_0$, $S_1$, $S_2$, and $S_3$ mean the first same complex value defined in a PCRS of an antenna port '0', the second same complex value defined in the PCRS of the antenna port '0', the first same complex value defined in a PCRS of an antenna port '1', and the second same complex value defined in the PCRS of the antenna port '1', respectively.

In this instance, $S_0$, $S_1$, $S_2$, and $S_3$ may be defined as values promised in advance between a transmitter and a receiver.

Alternatively, $S_0$, $S_1$, $S_2$, and $S_3$ may be sequences generated by applying an input of at least one of a Cell ID, a symbol index, or a subcarrier location to a specific sequence.

Further, $S_0$, $S_1$, $S_2$, and $S_3$ may have the same value.

Namely, $S_0=S_1$ and $S_2=S_3$.

A relationship of $S_0$, $S_1$, $S_2$, and $S_3$ may be defined by downlink control information (DCI) or radio resource control (RRC) signaling or may be promised in advance between the transmitter and the receiver.

In addition, in the above first to fourth embodiments, the PCRS ports are not limited to two.

Namely, the above-described methods may be equally applied to one PCRS port or three or more PCRS ports.

FIG. 18 is a flow chart illustrating an example of a method for transmitting and receiving a PCRS proposed by this specification.

First, a UE receives, from a base station, control information related to transmission of downlink data in S1810.

The control information may include at least one of a precoding scheme related to the downlink data, a number of transmission ranks, or a modulation and coding scheme (MCS) level.

Next, the UE checks a transmission location of a demodulation reference signal (DM-RS) for demodulating the downlink data based on the received control information in S1820.

Next, the UE receives, from the base station, a PCRS on at least one symbol after a transmission symbol of the DM-RS considering the checked transmission location of the DM-RS in S1830.

Here, if the DM-RS is transmitted on the same frequency as a frequency, on which the PCRS is transmitted, as a result of checking the transmission location of the DM-RS by the UE, a sequence of the PCRS may be used in the same manner as a sequence of the DM-RS.

On the other hand, if the DM-RS is not transmitted on the same frequency as a frequency, on which the PCRS is transmitted, as a result of checking the transmission location of the DM-RS by the UE, a sequence of the PCRS may be used in the same manner as a sequence of a DM-RS transmitted on a frequency closest to the frequency on which the PCRS is transmitted.

Further, the PCRS may be transmitted on one or more antenna ports.

If the PCRS is transmitted on multiple antenna ports, frequencies of PCRSs transmitted on different antenna ports may be different from each other.

If the PCRS is transmitted on two antenna ports, a PCRS transmitted on a first antenna port may be transmitted on a frequency corresponding to a subcarrier index #5, and a PCRS transmitted on a second antenna port may be transmitted on a frequency corresponding to a subcarrier index #6.

A sequence of the PCRS may be generated using a gold sequence.

More specifically, a sequence of the PCRS may be generated via an m-sequence of a gold sequence.

General Device to which the Present Invention is Applicable

FIG. 19 is a block diagram illustrating a configuration of a wireless communication device according to an embodiment of the present invention.

Referring to FIG. 19, a wireless communication system includes a base station 1910 and a plurality of UEs 1920 located within an area of the base station 1910.

The base station 1910 includes a processor 1911, a memory 1912, and a radio frequency (RF) unit 1913. The processor 1911 implements functions, processes, and/or methods proposed with reference to FIGS. 1 to 18. Layers of a radio interface protocol may be implemented by the processor 1911. The memory 1912 is connected to the processor 1911 and stores various information for driving the processor 1911. The RF unit 1913 is connected to the processor 1911 and transmits and/or receives radio signals.

The UE 1920 includes a processor 1921, a memory 1922, and an RF unit 1923. The processor 1921 implements functions, processes, and/or methods proposed with reference to FIGS. 1 to 18. Layers of a radio interface protocol may be implemented by the processor 1921. The memory 1922 is connected to the processor 1921 and stores various information for driving the processor 1921. The RF unit 1923 is connected to the processor 1921 and then transmits and/or receives radio signals.

The memory 1912/1922 may be provided inside or outside the processor 1911/1921 and may be connected to the processor 1911/1921 by various well-known means.

Moreover, the base station 1910 and/or the UE 1920 may have a single antenna or multiple antennas.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It will be apparent that some claims referring to specific claims may be combined with another claims referring to the other claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

While the present invention has been described and illustrated herein with reference to the preferred embodiments thereof, it will be apparent to those skilled in the art that various modifications and variations can be made therein without departing from the spirit and scope of the present invention. Thus, it is intended that the present invention covers the modifications and variations of this invention that come within the scope of the appended claims and their equivalents.

INDUSTRIAL APPLICABILITY

Although the present invention is described with reference to examples applying to 3GPP system and 5G system, it can be applied to various wireless communication systems other than them.

The invention claimed is:

1. A method of transmitting and receiving, by a user equipment (UE), a phase noise reference signal in a wireless communication system, the method comprising:
  determining a time location of a demodulation reference signal (DM-RS) that is received from a base station for demodulating downlink data; and
  receiving, from the base station and based on the determined time location of the DM-RS, the phase noise reference signal on at least one symbol after a symbol of the DM-RS,
  wherein the phase noise reference signal is received from the base station using at least one antenna port, such that for a first antenna port, the phase noise reference signal is received on a first frequency, and for a second antenna port, the phase noise reference signal is received on a second frequency different from the first frequency,
  wherein the DM-RS is defined by a DM-RS sequence, and
  wherein, based on the phase noise reference signal and the DM-RS being received on an identical frequency: the phase noise reference signal is also defined by the DM-RS sequence.

2. The method of claim 1, wherein based on the DM-RS and the phase noise reference signal being received on different frequencies:
  based on the determined time location of the DM-RS, the phase noise reference signal is defined by the DM-RS which is received on a frequency which is closest to a frequency on which the phase noise reference signal is received.

3. The method of claim 1, wherein for the first antenna port, the phase noise reference signal is received on the first frequency corresponding to a subcarrier index #5, and
  wherein for the second antenna port, the phase noise reference signal is received on the second frequency corresponding to a subcarrier index #6.

4. The method of claim 1, wherein the DM-RS sequence is generated using a Gold sequence.

5. The method of claim 1, further comprising:
  receiving, from the base station, control information related to a transmission of the downlink data from the base station to the UE, wherein the control information comprises at least one of (i) a precoding scheme related to the downlink data, (ii) a number of transmission ranks, or (iii) a modulation and coding scheme (MCS) level,
  wherein determining the time location of the DM-RS is based on the received control information.

6. A user equipment (UE) configured to transmit and receive a phase noise reference signal in a wireless communication system, the UE comprising:
  a radio frequency (RF) unit;
  at least one processor; and
  at least one computer memory operably connectable to the at least one processor and storing instructions that, when executed by the at least one processor, perform operations comprising:
  determining a time location of a demodulation reference signal (DM-RS) that is received from a base station for demodulating downlink data; and
  receiving, through the RF unit from the base station and based on the determined time location of the DM-RS, the phase noise reference signal on at least one symbol after a symbol of the DM-RS,
  wherein the phase noise reference signal is received from the base station using at least one antenna port, such that and wherein: for a first antenna port, the phase noise reference signal is received on a first frequency, and for a second antenna port, the phase noise reference signal is received on a second frequency different from the first frequency,
  wherein the DM-RS is defined by a DM-RS sequence, and
  wherein, based on the phase noise reference signal and the DM-RS being received on an identical frequency: the phase noise reference signal is also defined by the DM-RS sequence.

7. The UE of claim 6, wherein based on the DM-RS and the phase noise reference signal being received on different frequencies:
  based on the determined time location of the DM-RS, the phase noise reference signal is defined by the DM-RS which is received on a frequency which is closest to a frequency on which the phase noise reference signal is received.

8. The UE of claim 6, wherein for the first antenna port, the phase noise reference signal is received on the first frequency corresponding to a subcarrier index #5, and
wherein for the second antenna port, the phase noise reference signal is received on the second frequency corresponding to a subcarrier index #6.

9. The UE of claim 6, wherein the operations further comprise:
receiving, from the base station, control information related to a transmission of the downlink data from the base station to the UE, wherein the control information comprises at least one of (i) a precoding scheme related to the downlink data, (ii) a number of transmission ranks, or (iii) a modulation and coding scheme (MCS) level,
wherein determining the time location of the DM-RS is based on the received control information.

10. The UE of claim 6, wherein the DM-RS sequence is generated using a Gold sequence.

11. A processing apparatus configured to control a user equipment (UE) to transmit and receive a phase noise reference signal in a wireless communication system, the processing apparatus comprising:
at least one processor; and
at least one computer memory operably connectable to the at least one processor and storing instructions that, when executed by the at least one processor, perform operations comprising:
determining a time location of a demodulation reference signal (DM-RS) that is received from a base station for demodulating downlink data; and
receiving, from the base station and based on the determined time location of the DM-RS, the phase noise reference signal on at least one symbol after a symbol of the DM-RS,
wherein the phase noise reference signal is received from the base station using at least one antenna port, such that for a first antenna port, the phase noise reference signal is received on a first frequency, and for a second antenna port, the phase noise reference signal is received on a second frequency different from the first frequency,
wherein the DM-RS is defined by a DM-RS sequence, and
wherein, based on the phase noise reference signal and the DM-RS being received on an identical frequency: the phase noise reference signal is also defined by the DM-RS sequence.

12. The processing apparatus of claim 11, wherein based on the DM-RS and the phase noise reference signal being received on different frequencies:
based on the determined time location of the DM-RS, the phase noise reference signal is defined by the DM-RS which is received on a frequency which is closest to a frequency on which the phase noise reference signal is received.

13. The processing apparatus of claim 11, wherein for the first antenna port, the phase noise reference signal is received on the first frequency corresponding to a subcarrier index #5, and
wherein for the second antenna port, the phase noise reference signal is received on the second frequency corresponding to a subcarrier index #6.

14. The processing apparatus of claim 11, wherein the operations further comprise:
receiving, from the base station, control information related to a transmission of the downlink data from the base station to the UE, wherein the control information comprises at least one of (i) a precoding scheme related to the downlink data, (ii) a number of transmission ranks, or (iii) a modulation and coding scheme (MCS) level,
wherein determining the time location of the DM-RS is based on the received control information.

* * * * *